US011105469B2

(12) United States Patent
Elgowainy et al.

(10) Patent No.: US 11,105,469 B2
(45) Date of Patent: Aug. 31, 2021

(54) INTEGRATED TUBE-TRAILER AND STATIONARY GROUND STORAGE SYSTEM AND METHOD FOR ENHANCED PRESSURE CONSOLIDATION OPERATIONS FOR REFUELING OF GASEOUS FUELS

(71) Applicant: UChicago Argonne, LLC, Chicago, IL (US)

(72) Inventors: Amgad Elgowainy, Lisle, IL (US); Krishna Reddi, Willowbrook, IL (US)

(73) Assignee: Uchicago Argonne, LLC., Chicago, IL (US)

( * ) Notice: Subject to any disclaimer, the term of this patent is extended or adjusted under 35 U.S.C. 154(b) by 125 days.

(21) Appl. No.: 16/370,352

(22) Filed: Mar. 29, 2019

(65) Prior Publication Data

US 2020/0309323 A1 Oct. 1, 2020

(51) Int. Cl.
*F17C 5/06* (2006.01)
*F17C 5/04* (2006.01)

(52) U.S. Cl.
CPC .............. *F17C 5/06* (2013.01); *F17C 5/04* (2013.01); *F17C 2205/0134* (2013.01); *F17C 2223/035* (2013.01); *F17C 2227/0185* (2013.01); *F17C 2227/043* (2013.01)

(58) Field of Classification Search
CPC ...... F17C 5/06; F17C 5/04; F17C 2205/0134; F17C 2227/043
See application file for complete search history.

(56) References Cited

U.S. PATENT DOCUMENTS

| 5,409,046 | A | 4/1995 | Swenson et al. |
| 5,884,675 | A | 3/1999 | Krasnov |
| 7,624,770 | B2 | 12/2009 | Boyd et al. |
| 7,921,883 | B2 | 4/2011 | Cohen et al. |
| 9,739,418 | B2 | 8/2017 | Elgowainy et al. |
| 10,145,512 | B2 * | 12/2018 | Barker ............... F17C 5/06 |
| 10,267,456 | B2 * | 4/2019 | Reddi ............... F17C 5/06 |
| 10,508,770 | B2 * | 12/2019 | Cohen ............... F17C 5/06 |
| 2003/0175564 | A1 | 9/2003 | Mitlitsky et al. |
| 2005/0056661 | A1 | 3/2005 | Casamatta et al. |
| 2006/0174965 | A1 | 4/2006 | Hobbs |
| 2006/0118575 | A1 | 6/2006 | Boyd et al. |
| 2006/0180240 | A1 | 8/2006 | Niedzwiechi et al. |

(Continued)

FOREIGN PATENT DOCUMENTS

| EP | 1800930 B1 | 12/2005 |
| WO | WO2011133296 A1 | 10/2011 |
| WO | WO2018057891 A1 | 3/2018 |

*Primary Examiner* — Timothy P. Kelly
(74) *Attorney, Agent, or Firm* — Joan Pennington

(57) ABSTRACT

An enhanced operating method and an integrated tube-trailers and stationary ground storage system are provided for implementing enhanced pressure consolidation operations for refueling gaseous fuels. The integrated tube-trailers and stationary ground storage system includes gaseous fuel supply tube-trailers and stationary ground storage including at least one or more stationary pressure vessels. A compressor can be supplied by both the stationary ground storage and the tube-trailers. The stationary ground storage can provide higher pressure to the compressor than the tube-trailers, enabling enhanced compressor throughput during refueling operation, and enhanced utilization of tube-trailers payload.

18 Claims, 21 Drawing Sheets

(56) References Cited

U.S. PATENT DOCUMENTS

| | | |
|---|---|---|
| 2007/0051423 A1 | 3/2007 | Handa |
| 2007/0100503 A1 | 5/2007 | Balan et al. |
| 2009/0151812 A1 | 6/2009 | Allidieres |
| 2010/0193070 A1* | 8/2010 | Allidieres .................. F17C 5/06 141/11 |
| 2012/0318403 A1 | 12/2012 | Cohen et al. |
| 2013/0180620 A1 | 7/2013 | Praller |
| 2015/0020918 A1 | 1/2015 | Macaluso et al. |
| 2015/0090364 A1 | 4/2015 | Elgowainy et al. |
| 2015/0176766 A1 | 6/2015 | Nettis et al. |
| 2015/0308622 A1* | 10/2015 | Koonce ..................... F17C 5/06 141/4 |
| 2016/0102810 A1 | 4/2016 | Barker |
| 2018/0080608 A1 | 3/2018 | Reddi et al. |

\* cited by examiner

INTEGRATED TUBE-TRAILER AND STATIONARY GROUND STORAGE SYSTEM AND METHOD FOR ENHANCED PRESSURE CONSOLIDATION OPERATIONS FOR REFUELING OF GASEOUS FUELS

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

The present invention relates generally to gaseous fuel refueling systems, and more particularly, relates to a method and an integrated tube-trailers and stationary ground storage system for implementing pressure consolidation operations for refueling gaseous fuels.

DESCRIPTION OF THE RELATED ART

As used in the following description and claims, the term "gaseous fuels" should be broadly understood to include various currently available gaseous fuels, such as including hydrogen and compressed natural gas (CNG) and various other gaseous fuels that may be available in the future.

U.S. Patent Publication 2018/0080608 A1 published Mar. 22, 2018 by the present inventors and assigned to the present assignee discloses a method and system for operating refueling station tube-trailers and compressors to reduce hydrogen refueling cost. A hydrogen refueling station includes a two-tier fuel supply of pressure vessels on a refueling station tube-trailer, with a first tier and a second tier of pressure vessels including at least one or more pressure vessels connected together. A separate control unit is coupled to the first tier and the second tier of pressure vessels with each of the control units coupled to a compressor. The compressor is coupled to a high-pressure buffer storage by a separate control unit. In operation, pressure is monitored in each tier. Hydrogen is consolidated selectively between the first tier of pressure vessel banks, the second tier pressure vessels, and the high-pressure buffer. Based upon monitored pressures, one of the first tier of pressure vessels, the second tier pressure vessel banks, and the high-pressure buffer is used to refuel vehicles.

U.S. Pat. No. 9,739,418 issued Aug. 22, 2017 by the present inventors and assigned to the present assignee discloses a method and apparatus for operating a refueling station including source tube-trailers and at least one compressor to reduce refueling cost. The refueling station includes a gaseous fuel supply source including a plurality of tanks on a tube trailer coupled to a first control unit, and a high-pressure buffer storage having predefined capacity coupled to a second control unit and the first tanks by a pressure control valve and the first control unit, and at least one compressor. The refueling station is operated at different modes depending on a state of the refueling station at the beginning of each operational mode. The refueling system is assessed at the end of each operational mode to identify the state of the system and select a next mode of operation. The operational modes include consolidating hydrogen, or any gaseous fuel, within the tubes mounted on the trailer.

While both the above identified U.S. Pat. No. 9,739,418 and U.S. Patent Publication 2018/0080608 A1 provide improvements over the prior art, it is desirable to provide an integrated tube-trailers and stationary ground storage system and an enhanced operating method for implementing enhanced pressure consolidation operations for refueling gaseous fuels.

It is desirable to provide such enhanced operating methods and integrated tube-trailers and stationary ground storage system for implementing enhanced pressure consolidation operations for refueling gaseous fuels enabling enhanced utilization of tube-trailer payload.

It is desirable to provide such enhanced operating methods and integrated tube-trailers and stationary ground storage system that maximizes compressor throughput during station operation.

It is desirable to provide such enhanced operating methods and integrated tube-trailers and stationary ground storage system where the compressor can be supplied by the tube trailers for consolidation and stationary ground storage for refueling.

It is desirable to provide such enhanced operating methods and integrated tube-trailers and stationary ground storage system where the stationary ground storage can provide higher pressure to the compressor than tube trailers enabling enhanced throughput of the compressor and enhanced refueling capacity.

It is desirable to provide such enhanced operating methods and integrated tube-trailers and stationary ground storage system enabling enhanced pressure and refueling control capability and flexibility.

SUMMARY OF THE INVENTION

Principal aspects of the present invention are to provide an enhanced operating method and an integrated tube-trailers and stationary ground storage system for implementing enhanced pressure consolidation operations for refueling gaseous fuels. Other important aspects of the present invention are to provide such method and system substantially without negative effect and that overcome some of the disadvantages of prior art arrangements.

In brief, an enhanced operating method and an integrated tube-trailers and stationary ground storage system are provided for implementing enhanced pressure consolidation operations for refueling gaseous fuels. The integrated tube-trailers and stationary ground storage system includes gaseous fuel supply pressure vessels or tube-trailers and stationary ground storage including at least one or more stationary pressure vessels. A compressor can be supplied by the stationary ground storage and the tube-trailers. The stationary ground storage provides higher pressure to the compressor than the tube-trailers, enabling enhanced compressor throughput during refueling operation.

In accordance with features of the invention, in some refueling configurations, the tube-trailer storage may be at a higher or equal pressure to stationary ground storage.

In accordance with features of the invention, a first control unit is coupled to the stationary ground storage and a second control unit is coupled to the tube-trailers. The compressor can be supplied by the stationary ground storage and the tube-trailers via the respective first control unit and the second control unit. The refueling gaseous fuel is respectively supplied by the tube-trailers for consolidation, and by either the tube-trailer or the stationary ground storage for refueling.

In accordance with features of the invention, the compressor is coupled to a high-pressure buffer storage by a separate control unit. The high-pressure buffer storage optionally is used to refuel vehicles.

In accordance with features of the invention, refueling gaseous fuel from the tube trailers is consolidated into the stationary ground storage when the compressor is idle. The use of the stationary ground storage at the higher pressure for refueling significantly improves tube-trailer payload utilization as compared to only using tube-trailers of conventional arrangements.

In accordance with features of the invention, integrated tube-trailers and stationary ground storage system enables effectively and efficiently using a single compressor together with reducing the refueling costs.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
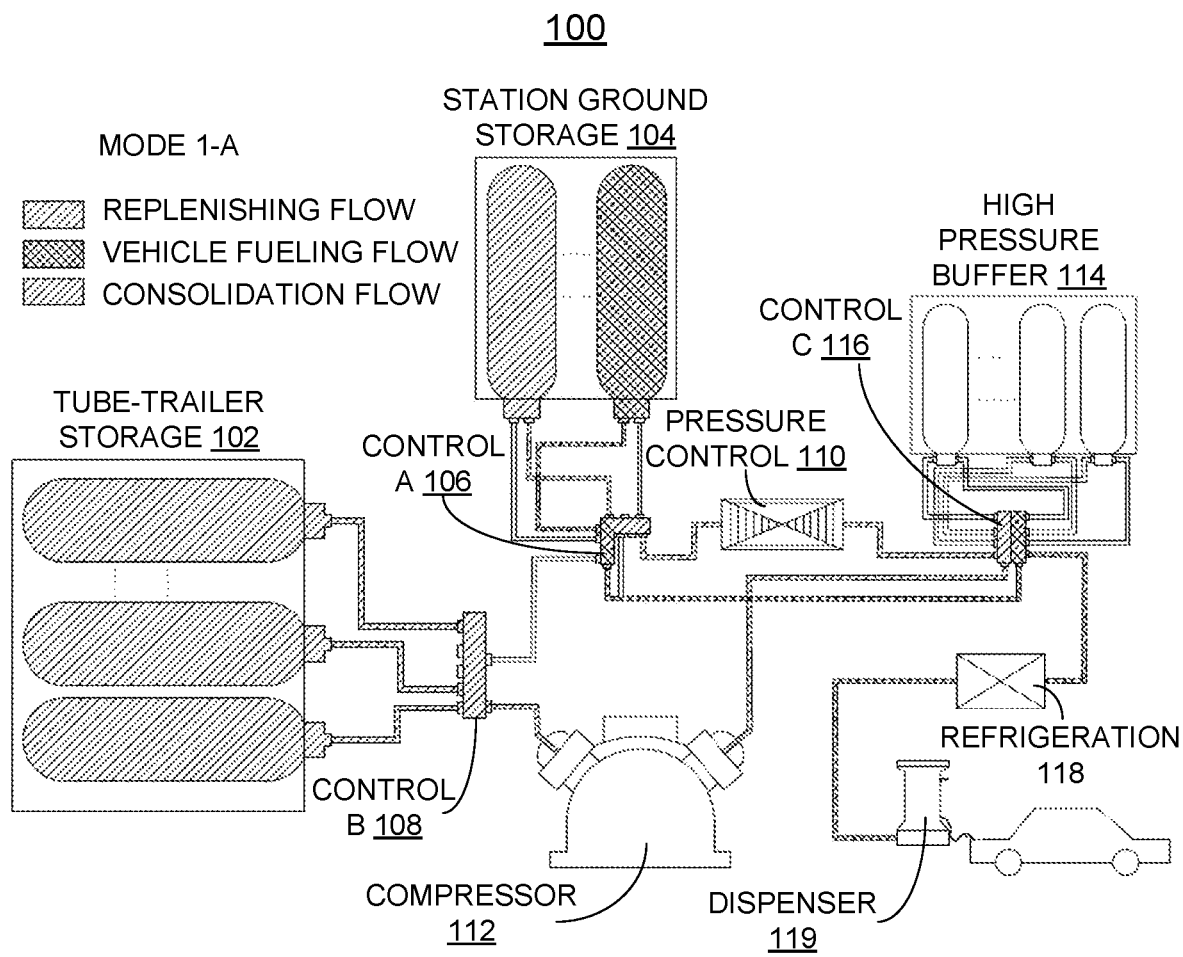
FIGS. 1A, 1B, 2A, 2B, 3, 4, 5A, 5B, 6A, 6B, 6C, 7A, 7B, 8, 9A, 9B, 10, 11A, 11B, 11C, and 12 schematically illustrate not to scale examples of integrated tube-trailers and stationary ground storage systems for implementing methods for implementing enhanced pressure consolidation operations for refueling gaseous fuels in accordance with a preferred embodiment.

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, an enhanced operating method and an integrated tube-trailers and stationary ground storage system are provided for implementing enhanced pressure consolidation operations for refueling gaseous fuels. The integrated tube-trailers and stationary ground storage system includes gaseous fuel supply pressure vessels or tube-trailers and stationary ground storage including at least one or more stationary pressure vessels. A compressor can be supplied by the stationary ground storage and the tube-trailers. The stationary ground storage can provide higher pressure to the compressor than the tube-trailers, enabling enhanced compressor throughput during refueling operation.

Having reference now to the drawings, in FIGS. 1A, 1B, 2A, 2B, 3, 4, 5A, 5B, 6A, 6B, 6C, 7A, 7B, 8, 9A, 9B, 10, 11A, 11B, 11C, and 12, there are schematically shown examples of integrated tube-trailers and stationary ground storage system modes for implementing enhanced pressure consolidation operations for refueling gaseous fuels in accordance with a preferred embodiment.

As shown in FIGS. 1A, 1B, 2A, 2B, 3, 4, 5A, 5B, 6A, 6B, 6C, 7A, 7B, 8, 9A, 9B, 10, 11A, 11B, 11C, and 12, each illustrated example integrated tube-trailers and stationary ground storage system includes gaseous fuel supply pressure vessels of tube-trailer storage or tube-trailers 102 and stationary ground storage 104 including at least one or more stationary pressure vessels.

A first control unit A, 106 is coupled to the stationary ground storage 104 and a second control unit B, 108 is coupled to the tube-trailers 102. The first control unit A, 106 is coupled to a pressure control device 110. A compressor 112 (FIGS. 1A, 1B, 2A, 2B, 3, 4, 9A, 9B, 10) or a compressor 502 (FIGS. 5A, 5B, 6A, 6B, 6C, 7A, 7B, 8, 11A, 11B, 11C, and 12) can be supplied by the stationary ground storage 104 and the tube-trailers 102. The stationary ground storage 104 typically provides higher pressure to the compressor 112 than the tube-trailers 102, enabling enhanced compressor throughput during refueling operation. The compressor 112 is coupled to an optional high-pressure buffer storage 114 by a separate control unit C, 116, as shown in FIGS. 1A, 1B, 2A, 2B, 3, 4, 5A, 5B, 6A, 6B, 6C, 7A, 7B, and 8. The pressure control device 110 connects the control unit A, 106 to the control unit C, 116. An optional refrigeration unit 118 cools the gaseous fuel to a required temperature coupled between the control unit C, 116 and a dispenser 119 which regulates the gaseous fuel flow into a vehicle's onboard tank.

In accordance with features of the invention, refueling gaseous fuel is respectively supplied by the tube-trailers 102 for consolidation and the stationary ground storage 104 for refueling. Refueling gaseous fuel from the tube trailers 102 is consolidated into the stationary ground storage 104 when the compressor 112 is idle. The use of the stationary ground storage 104 at the higher pressure for refueling significantly improves tube-trailer payload utilization as compared to only using refueling tube-trailers 102 of conventional arrangements. The integrated tube-trailers and stationary ground storage system enables effective and efficient use of a single compressor 112 together with reducing the refueling costs.

Referring now to FIG. 1A, there is shown an operational mode 1A generally designated by the reference character 100. In Mode 1A, 100, the dispenser 120 is connected via the optional refrigeration unit 118 and the control unit A, 106 to the stationary ground storage 104 for vehicle fill. In Mode 1A, the high-pressure buffer storage 114 is at full capacity and the dispenser 119 is occupied by a vehicle to begin refueling. The gaseous fuel is directly drawn from the stationary ground storage 104 with higher pressure than tube trailer storage 102, bypassing compressor 112 and high-pressure buffer storage 114, to initially fill the vehicle's tank. For example, stationary ground storage 104 may initially fill the vehicle, while the gaseous fuel supply pressure vessels or the tube-trailer storage 102 may replenish the high-pressure buffer storage 114 through the compressor 112. Alternatively, if the tube-trailer storage 102 is at a higher or equal pressure to stationary ground storage 104, the tube-trailer storage may initially fill the vehicle, while the stationary ground storage may replenish the high-pressure buffer storage 114 through the compressor 112.

In Mode 1A, 100, an inactive pressure vessel bank stationary ground storage 104 is filled (consolidated) from the gaseous fuel supply pressure vessels or tube-trailer storage 102 through the compressor 112. This continues until consolidation is complete for all pressure vessel bank stationary ground storage 104, except the one being used for vehicle fill.

Figure 1B:
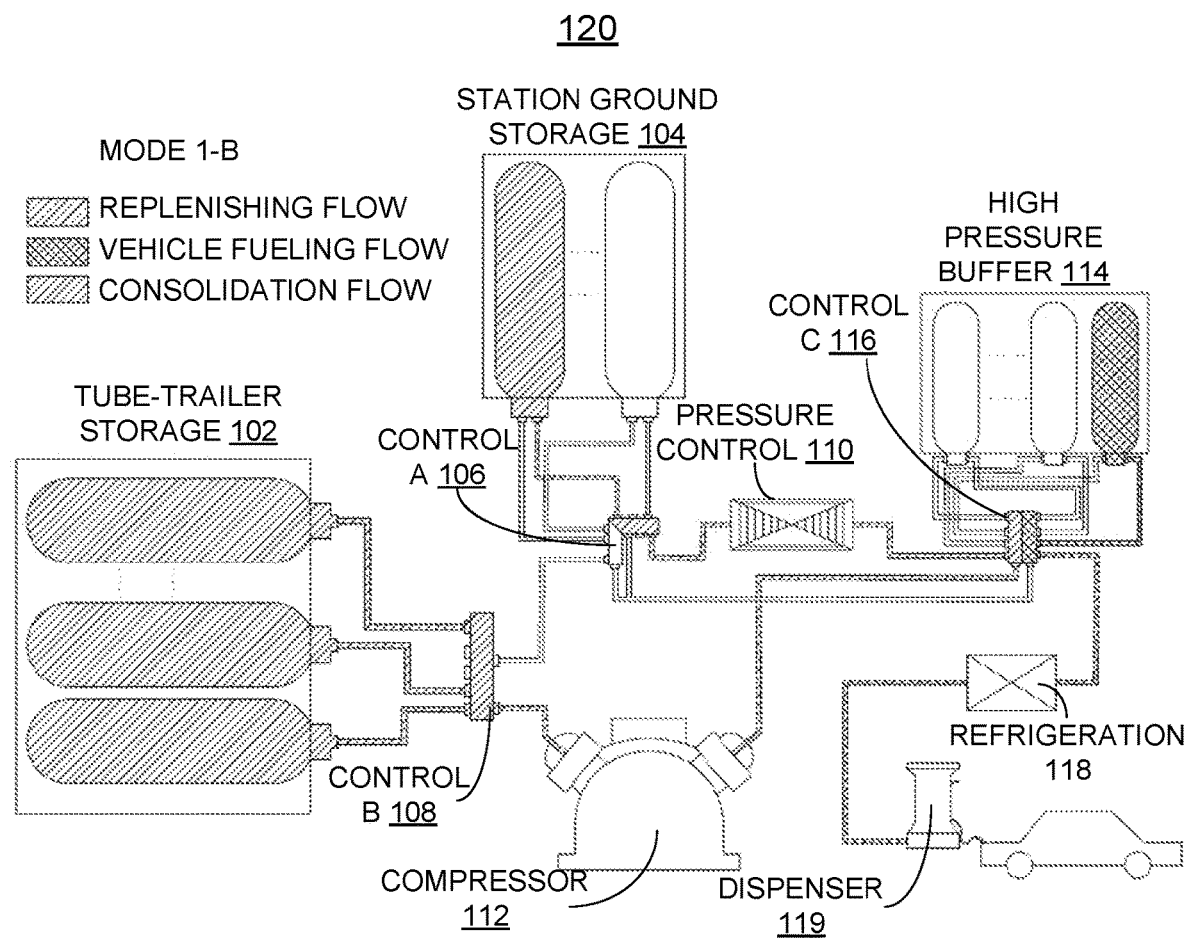

Referring now to FIG. 1B, there is shown an operational mode 1B generally designated by the reference character 120. Mode 1B, 120, immediately follows Mode 1A with the dispenser 119 connected to the buffer storage 114 to fill the vehicle to its maximum possible state of charge.

The gaseous fuel is drawn from the high-pressure buffer storage 114 pressure vessel bank with lowest pressure (above the vehicle tank pressure at that instant) to continue filling the vehicle's tank. This continues until the mass flow rate between the selected high-pressure buffer storage's pressure vessel bank and the vehicle's tank reaches a predefined lower limit or until the pressure at the dispenser 119 cannot sustain a necessary flow required for vehicle fueling. At this point, the control unit C, 116 or dispenser 119 switches the gaseous fuel source to the next high-pressure buffer storage's pressure vessel bank with pressure higher than the vehicle's tank pressure. The control unit C, 116 or dispenser 119 keeps switching to the next higher pressure banks of the high-pressure buffer source 114 until the vehicle's tank reaches its maximum possible state of charge. Mode 1B ends when the vehicle reaches its maximum possible state of charge.

In Mode 1B, 120, the pressure vessel bank of stationary ground storage 104 with the highest pressure (below the rated maximum pressure) in stationary ground storage 104 is filled (consolidated) from tube-trailer storage 102 through the compressor 112. If the pressure in the pressure vessel bank of the stationary ground storage 104 reaches the rated maximum pressure, the next highest pressure vessel bank of stationary ground storage 104 is selected to be filled from tube-trailer storage 102 (consolidated). This continues until there is a change of state or until consolidation is complete, where all pressure vessel banks of stationary ground storage 104 except the one being drawn from, are at their rated maximum pressure or until all pressure vessels in tube-trailer storage 102 are at their minimum specified operating (return) pressure.

Figure 2A:
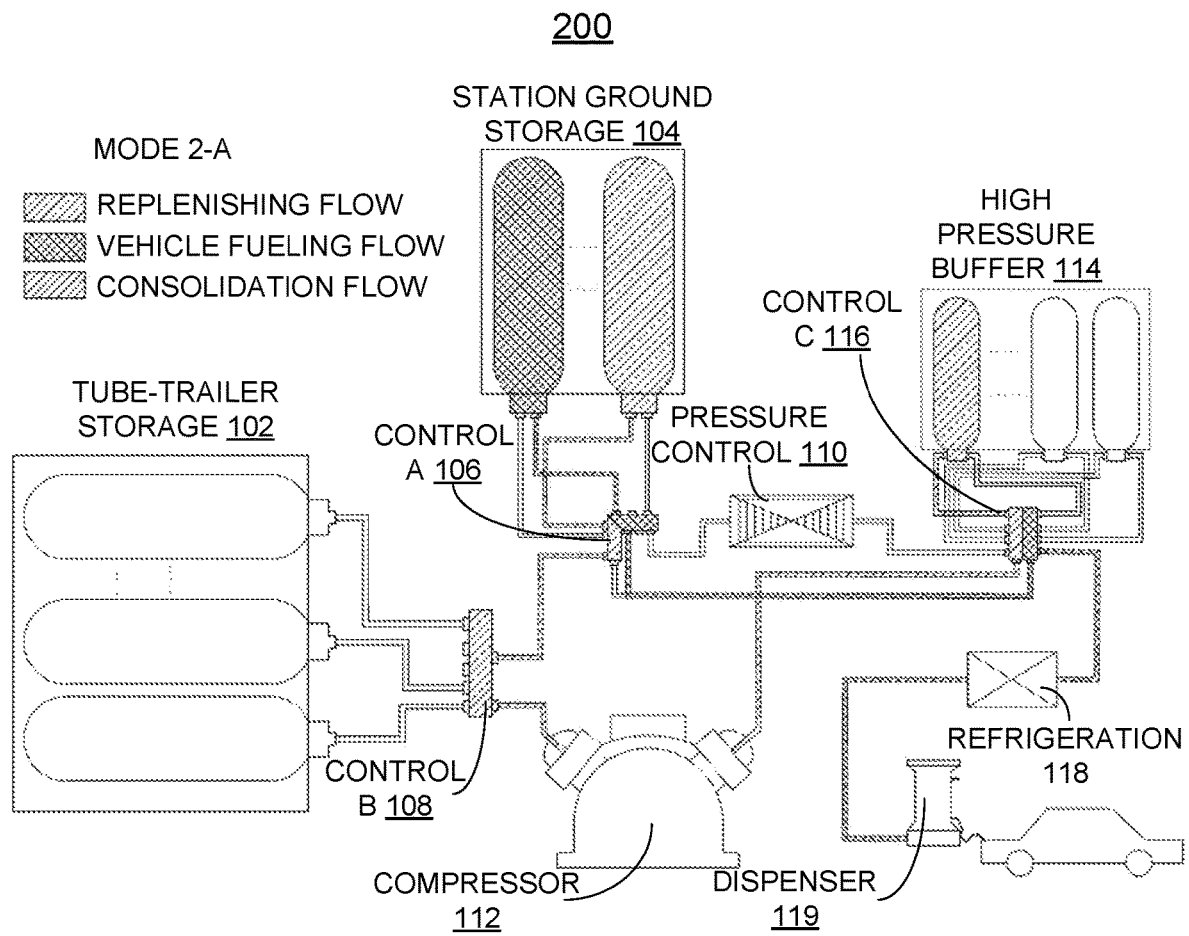
Figure 2B:
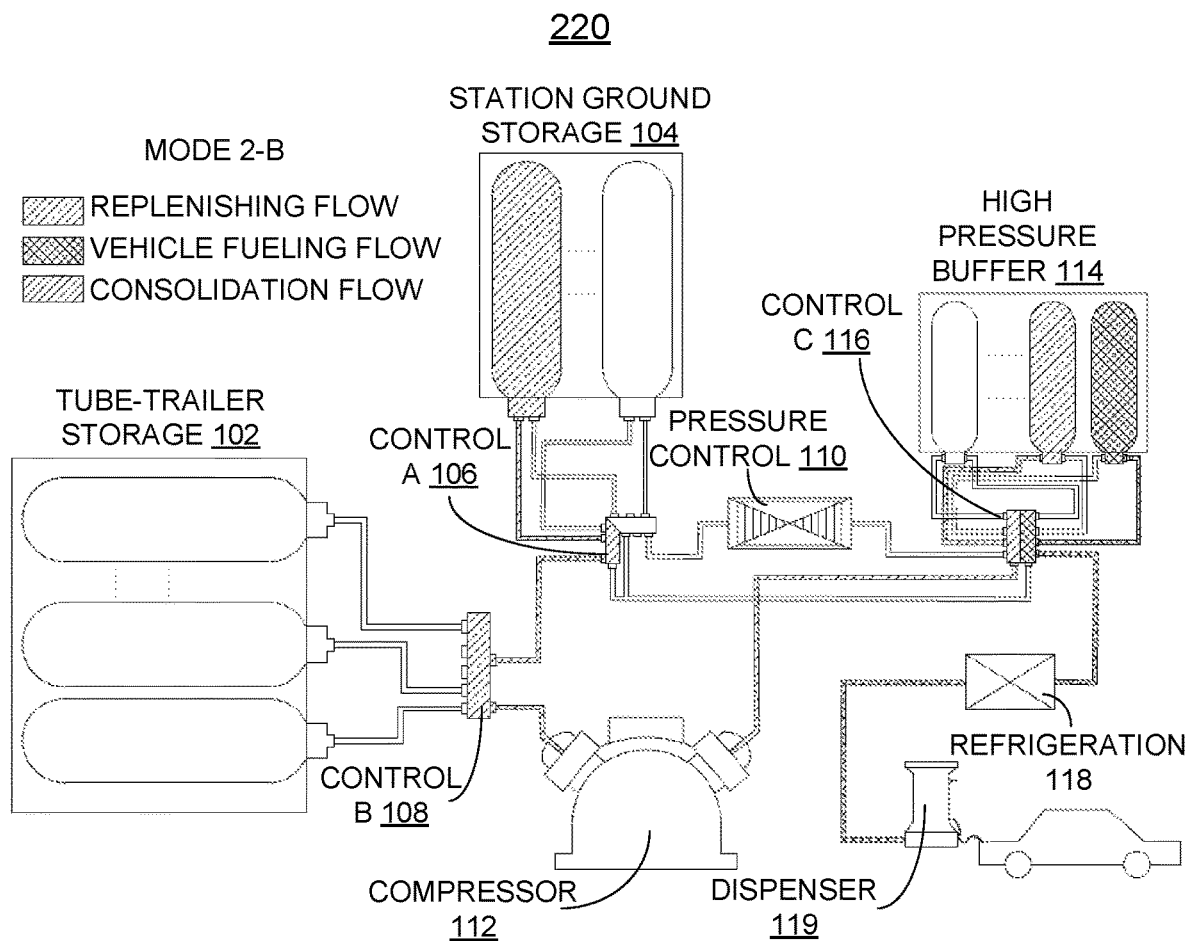

Referring to FIGS. 2A, and 2B, there are shown respective operational modes 2A, 2B generally designated by the respective reference character 200, 220, when the high-pressure buffer storage 114 is not at full capacity and a vehicle is refueling at the dispenser 119. The operational mode 2A, 200, and mode 2B, 220 occurs often during peak fueling periods (with consecutive vehicle fills).

In Mode 2A, 200 shown in FIG. 2A, dispenser 119 is connected to the stationary ground storage 104 for initial vehicle fill. The gaseous fuel is directly drawn from the stationary ground storage 104, preferably with the highest pressure vessel bank, bypassing compressor 112 and buffer storage 114 to fill the vehicle's tank. Alternatively, if the tube-trailer storage 102 is at a higher or equal pressure to stationary ground storage 104, the tube-trailer storage may initially fill the vehicle, while the stationary ground storage may replenish the high-pressure buffer storage 114 through the compressor 112. Mode 2A, 200 ends when the mass flow rate between the stationary ground storage 104, or the tube-trailer storage 102, and the vehicle's tank reaches a predefined lower limit or until the pressure at the dispenser 119 cannot sustain a necessary flow required for vehicle fueling.

In Mode 2A, 200, an inactive pressure vessel bank of high-pressure buffer storage 114 with the highest pressure is filled from the inactive pressure vessel bank in stationary ground storage 104, with the highest pressure, through the compressor 112. Once the high-pressure buffer storage 114 pressure vessel bank reaches its rated maximum pressure, the compressor 112 discharge switches to fill the next pressure vessel bank of high-pressure buffer storage 114 with highest pressure, below rated maximum pressure. This continues until all pressure vessel banks of the high-pressure buffer storage 114 reach their rated maximum pressure or until pressure vessel banks of stationary ground storage 104 are at their minimum specified operating pressure.

In FIG. 2B with Mode 2B, 220 the dispenser 119 is connected to the high-pressure buffer storage 114 to fill the vehicle to its maximum possible state of charge. The gaseous fuel is drawn from the high-pressure buffer storage 114 vessel bank with the lowest pressure, above the vehicle tank pressure at that instant, to continue filling the vehicle's tank. This continues until the mass flow rate between the selected high-pressure buffer storage's pressure vessel bank and the vehicle's tank reaches a predefined lower limit or until pressure at the dispenser 119 cannot sustain a necessary flow required for vehicle fueling. At this point, the control unit C, 116 or dispenser 119 switches the source of gaseous fuel to the next pressure vessel bank of high-pressure buffer storage 114 with pressure higher than the vehicle's tank pressure. The dispenser 119 keeps switching to the next higher pressure banks of the high-pressure buffer source 114 until the vehicle's tank reaches its maximum possible state of charge. Mode 2B, 220 ends when the vehicle reaches its maximum possible state of charge.

In Mode 2B, 220, an inactive pressure vessel bank of high-pressure buffer storage 114 with the highest pressure is filled from the inactive pressure vessel bank of stationary ground storage 104, with the highest pressure, through the compressor 112. Once the high-pressure buffer storage 114 pressure vessel bank reaches its rated maximum pressure, the compressor 112 discharge switches to fill the next high-pressure buffer storage's pressure vessel bank with highest pressure (below rated maximum pressure). This continues until all the high-pressure buffer storage pressure 114 vessel banks reach their rated maximum pressure or until all pressure vessel banks of stationary ground storage 104 are at their minimum specified operating pressure.

Figure 3:
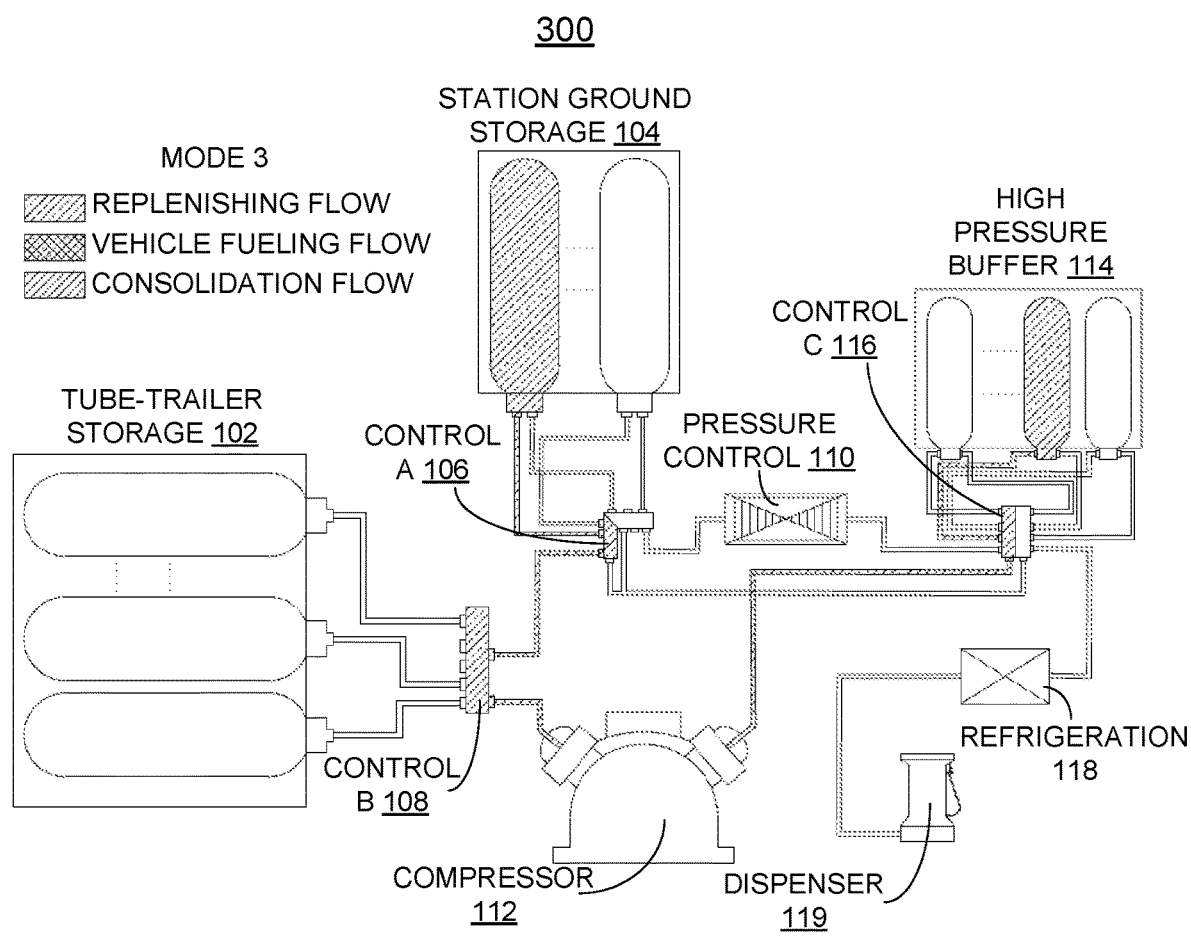

Referring to FIG. 3, there is shown an operational Mode 3 generally designated by the reference character 300. In Mode 3, 300, the dispenser 119 is not occupied and the buffer storage 114 is not at full capacity. The vessel bank of high-pressure buffer storage 114 with the highest pressure is filled from the stationary ground storage 104 vessel with the highest pressure, through the compressor 112. Once this high-pressure buffer storage pressure vessel bank reaches its rated maximum pressure, the compressor discharge switches to fill the next vessel bank of the high-pressure buffer storage 114 with highest pressure (below rated maximum pressure). This continues until all the high-pressure buffer storage pressure vessel banks reach their rated maximum pressure or until vessels of stationary ground storage 104 are at their minimum specified operating pressure, or until there is a change of state.

Figure 4:
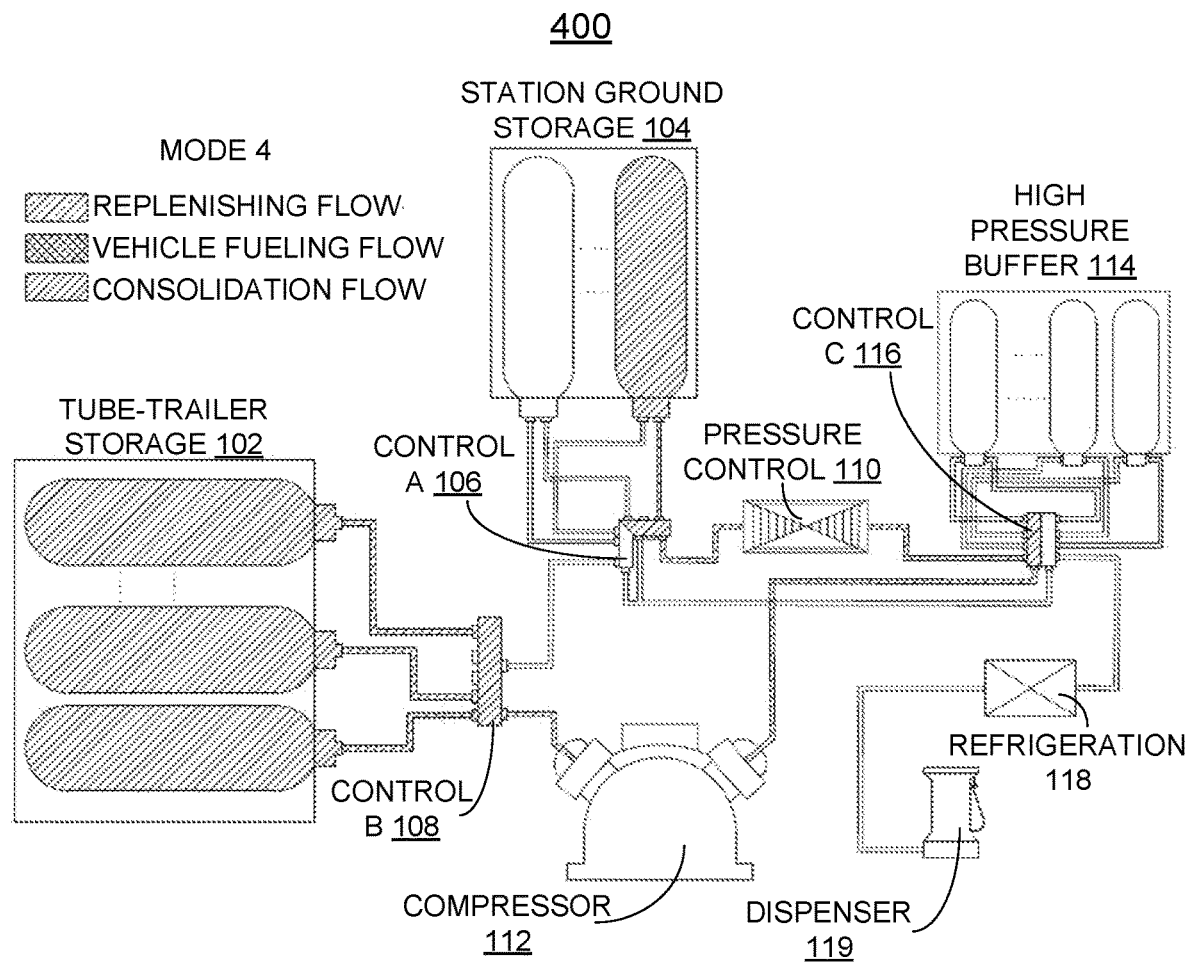

Referring to FIG. 4, there is shown an operational Mode 4 generally designated by the reference character 400. In Mode 4, 400, the dispenser 119 is not occupied and the buffer storage 114 is at full capacity. The pressure vessel bank of stationary ground storage 104 with the highest pressure is filled (consolidated) from tube-trailer storage 102 through the compressor 112. When the pressure in the destination pressure vessel bank of stationary ground storage 104 reaches the rated maximum pressure, the next highest pressure vessel bank of stationary ground storage 104 is selected to be filled from tube-trailer storage 102 (consolidated). This continues until consolidation is complete, where all pressure vessel banks of stationary ground storage 104 are either at rated maximum pressure or until all pressure vessels of tube-trailer storage 102 are at their minimum specified operating (return) pressure.

Figure 5A:
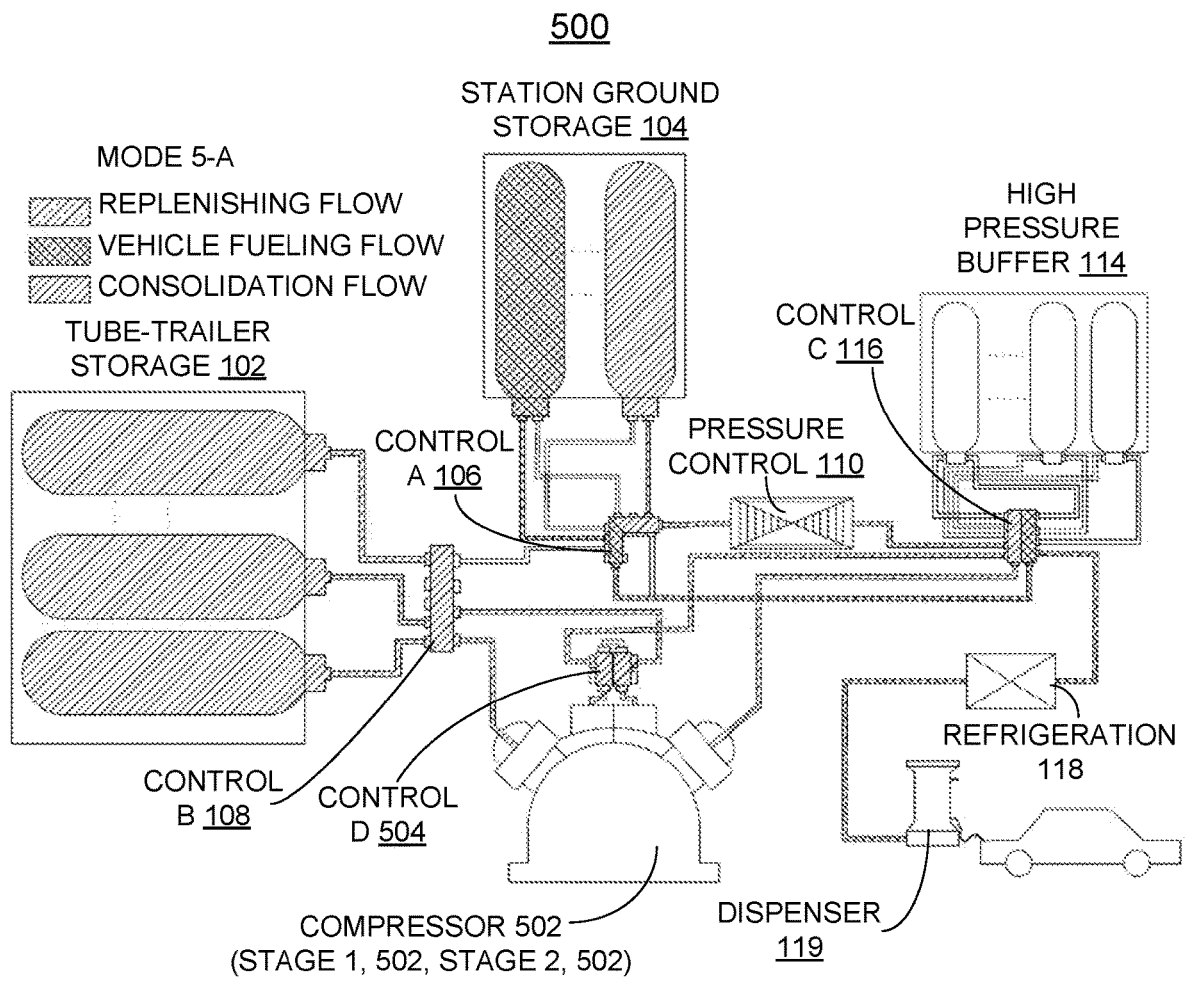
Figure 5B:
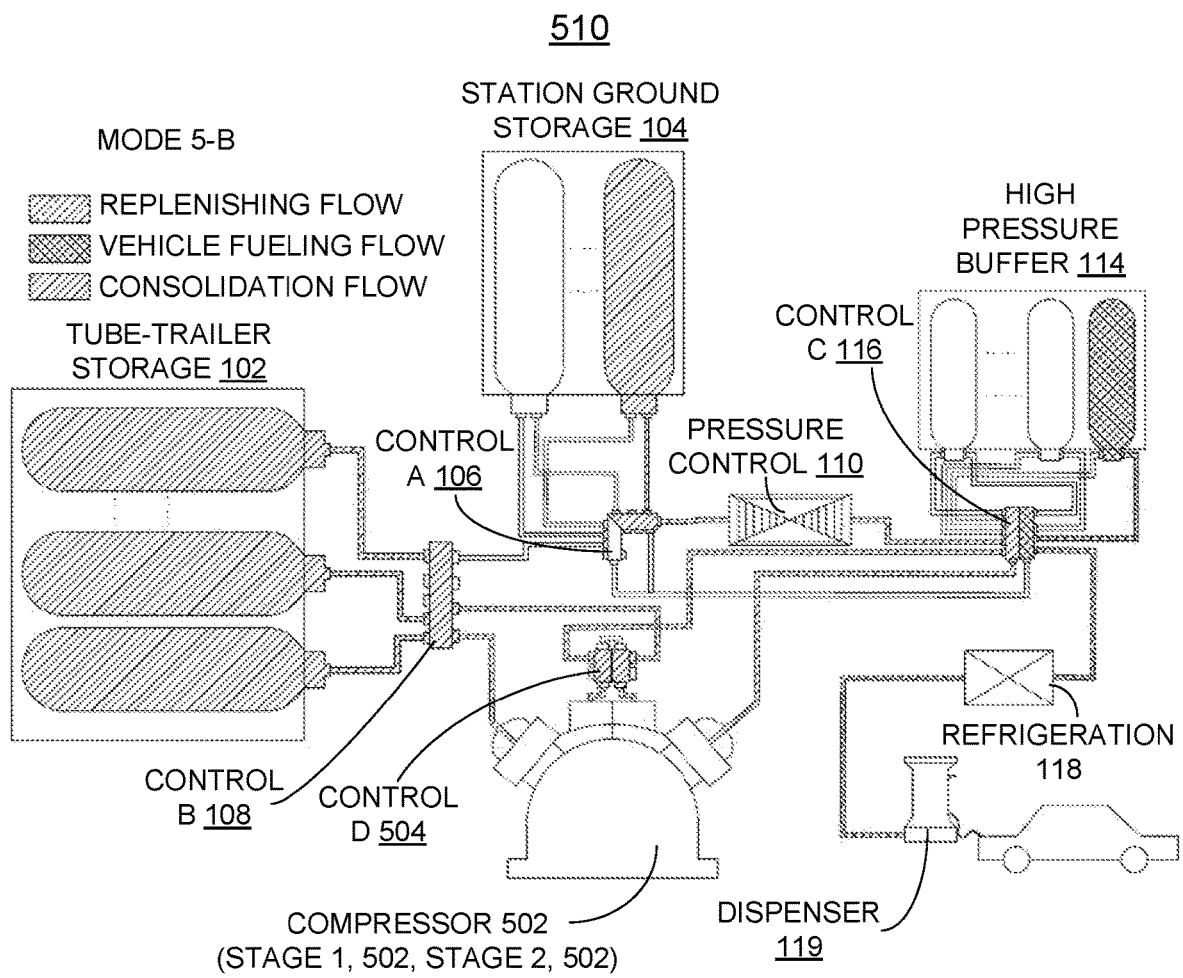

Referring to FIGS. 5A, and 5B, there are shown operational modes as an operational Mode 5-A generally designated by the reference character 500 and an operational Mode 5-B generally designated by the reference character 510. In FIGS. 5A, 5B, and FIGS. 6A, 6B, 7A, 7B, 8, 11A, 11B, 11C, and 12, each illustrated operational mode is provided with a multi-stage compressor 502 that has two stages: stage 1, 502, and stage 2, 502, with an associated control D, 504.

When the two stages, stage 1, 502, and stage 2, 502, of the multi-stage compressor 502 are configured to work independently (i.e., each stage can independently handle a separate stream) similar to the operation of two separate single-stage compressors, the operation of the refueling station can be represented in the illustrated respective operational mode of FIGS. 5A, 5B, and FIGS. 6A, 6B, 6C, 7A, 7B, 8, 11A, 11B, 11C, and 12. In an arrangement, stage 1, 502 and stage 2, 502 of the compressor 502 can be simultaneously used to perform consolidation by moving the gaseous fuel from pressure vessels of tube-trailer storage 102 to stationary ground storage pressure vessels 104. In another arrangement, stage 1, 502 of the compressor 502 can be dedicated to perform consolidation by moving the gaseous fuel from pressure vessels of tube-trailer storage 102 to stationary ground storage 104; while simultaneously the other stage 2, 502 of the compressor 502 can be dedicated to replenishing the high-pressure buffer storage 114 by moving gaseous fuel from stationary ground storage 104 to the high-pressure buffer storage 114. During multiple station operational modes, the following Tasks 1 (Vehicle fueling), Task 2 (Replenishing High-pressure Buffer Storage) and Task 3 (Stationary Ground Storage Consolidation) are carried out whenever and wherever possible.

If high-pressure buffer storage 114 is full and consolidation from tube-trailers 102 into stationary ground storage 104 is possible, Task 2 (Replenishing High-pressure Buffer Storage) is not carried out. In such case, the compressor's stage 2, 502 can be effectively idle (for example, by cycling gaseous fuel in a closed loop with no effect), while the stage 1, 502 of the compressor 502 consolidates from tube-trailer storage 102 into stationary ground storage 104; or the stage 1, 502 and stage 2, 502 of the compressor 502 can independently and simultaneously perform consolidation by moving the gaseous fuel from pressure vessels of tube-trailer storage 102 to stationary ground storage 104. Similarly, if high-pressure buffer storage 114 is not full and the stationary ground storage 104 cannot be consolidated (i.e., all pressure vessels of stationary ground storage 104, except the one being drawn from, are at rated maximum pressure, or all pressure vessels in the tube-trailer storage 102 are at their specified minimum operating pressure), stage 1, 502 and stage 2, 502 of the compressor 502 may operate together in series to replenish the high-pressure buffer storage 114.

Task 1 (Vehicle Fueling):

(a) The gaseous fuel is directly drawn from the pressure vessel bank of stationary ground storage 104 with the highest pressure (i.e., bypassing compressor 502 and buffer storage 114) to fill the vehicle's tank. Alternatively, if the tube-trailer storage 102 is at a higher or equal pressure to stationary ground storage 104, the tube-trailer storage 102 may initially fill the vehicle. This sub-task ends when the mass flow rate between the stationary ground storage 104 and the vehicle's tank reaches a predefined lower limit or until the pressure at the dispenser 119 cannot sustain a necessary flow required for vehicle fueling.

(b) The gaseous fuel is drawn from the high-pressure buffer storage 114 of the pressure vessel bank with lowest pressure (above the vehicle tank pressure at that instant) to continue filling the vehicle's tank. This continues until the mass flow rate between the selected high-pressure buffer storage's pressure vessel bank and the vehicle's tank reaches a predefined lower limit or until the pressure at the dispenser 119 cannot sustain a necessary flow required for vehicle fueling. At this point, the dispenser 119 (or control unit C, 116) switches the source of gaseous fuel to the next high-pressure buffer storage's pressure vessel bank with pressure higher than the vehicle's tank pressure. The dispenser 119 keeps switching to the next higher pressure banks of the high-pressure buffer storage 114 until the vehicle's tank reaches its maximum possible state of charge. This task ends when the vehicle reaches its maximum possible state of charge.

Task 2 (Replenishing High-Pressure Buffer Storage)

The inactive pressure vessel bank of high-pressure buffer storage 114 with the highest pressure is filled from the inactive pressure vessel stationary ground storage 104, with the highest pressure, through the compressor's stage 2, 502. Once the high-pressure buffer storage 114 pressure vessel bank reaches its rated maximum pressure, the discharge from the compressor's second stage 2, 502 switches to fill the next high-pressure buffer storage's pressure vessel bank with highest pressure (below rated maximum pressure). This continues until all pressure vessel banks of the high-pressure buffer storage 114 reach their rated maximum pressure, or until vessels of the stationary ground storage 104 are at their minimum specified operating pressure, or until there is a change of state.

(b) Tube-trailers pressure vessels 102 are at their minimum specified operating pressure. The inactive high-pressure buffer storage 114 vessel bank with the highest pressure is filled from the inactive pressure vessel of stationary ground storage 104, with the highest pressure, through a combined operation of the two compressor stages 1, 502, stage 2, 502 (in which the compressor's stage 1, 502 draws from stationary ground storage 104 and feeds into the compressor's stage 2, 502). Once the high-pressure buffer storage 114 pressure vessel bank reaches its rated maximum pressure, the discharge from the compressor's second stage 2, 502 switches to fill the next high-pressure buffer storage's pressure vessel bank with highest pressure (below rated maximum pressure). This continues until all the pressure vessel banks of the high-pressure buffer storage 114 reach their rated maximum pressure, or until all pressure vessel banks of stationary ground storage 104 are at their minimum specified operating pressure, or until there is change of state.

Task 3 (Stationary Ground Storage Consolidation):

The inactive pressure vessel bank with the highest pressure in stationary ground storage 104 is filled (consolidated) from the pressure vessels in tube-trailers 102 through stage 1, 502 of the compressor 502, or through the separate and parallel operation of stage 1 and stage 2 of compressor 502 (in which both of the compressor stage 1 and stage 2, 502 draw separately from tube trailers 102), or through the series operation of combined stage 1 and stage 2 of compressor 502 (in which the compressor's stage 1, 502 draws from tube-trailers 102 and feeds into the compressor's stage 2, 502). If the pressure in the destination pressure vessel bank (stationary ground storage 104) reaches the rated maximum pressure, the next highest pressure vessel bank in the stationary ground storage 104 is selected to be filled (consolidated). This continues until consolidation is complete (i.e., all pressure vessel banks in stationary ground storage 104, except the one being drawn from, are either at their rated maximum pressure or all pressure vessels in tube-trailers 102, are at their specified minimum operating pressure), or until there is a change of state.

Referring to FIGS. 5A, and 5B, there are shown respective operational modes 5A, 5B generally designated by the reference character 500, 510. In Mode 5A, 500, the high-pressure buffer storage 114 is at full capacity and the dispenser 119 is occupied by a vehicle to begin refueling. Operational modes 5A, 500, and 5B, 510 are similar to Modes 1A, 100, and 1B, 120 with compressor 502 that having two stages 1-2, 502, consolidating from tube-trailers 102 to stationary ground storage 104; Complete Task 1 (*a*) and Task 3, followed by Task 1 (*b*) and Task 3.

Figure 6A:
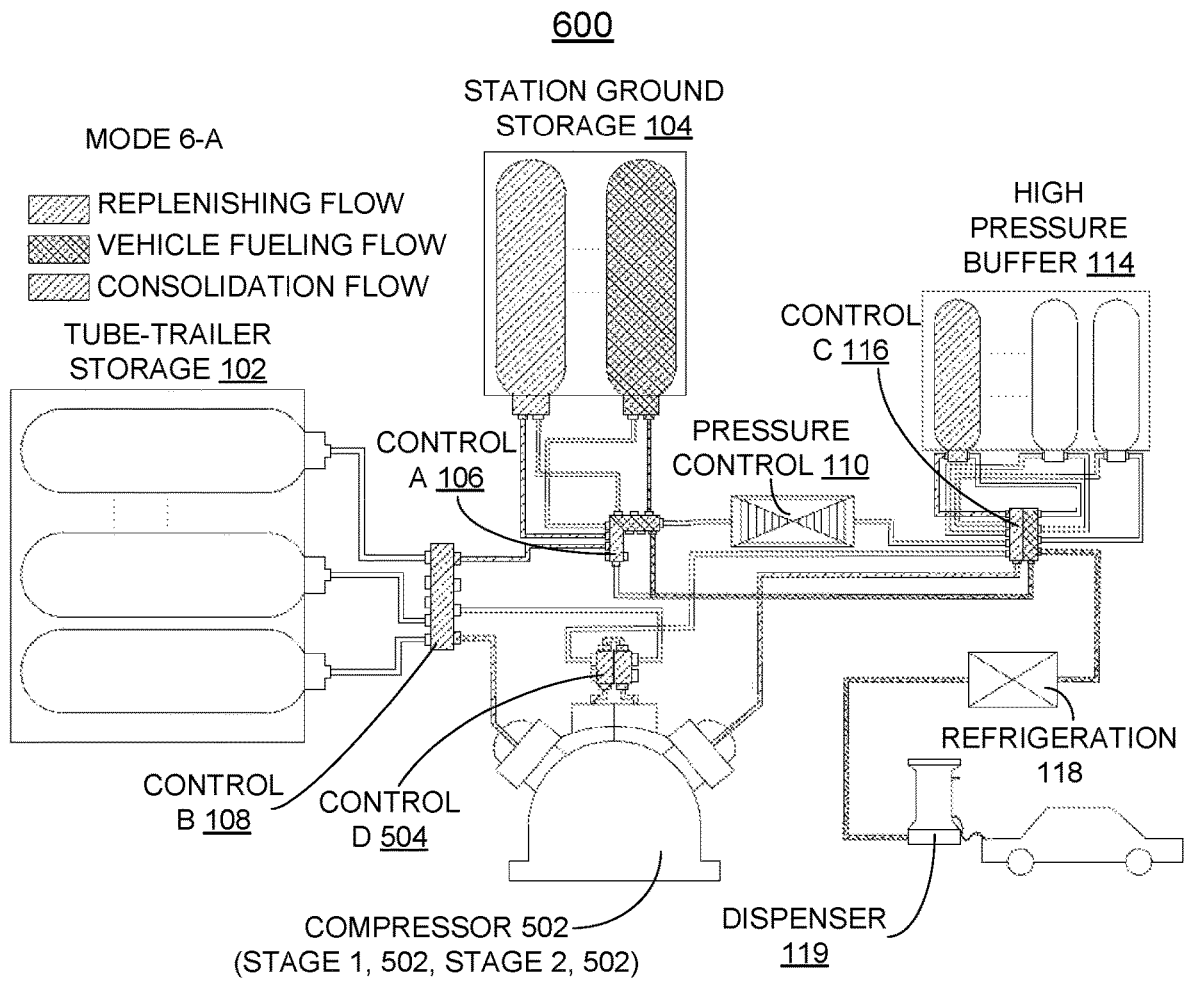
Figure 6B:
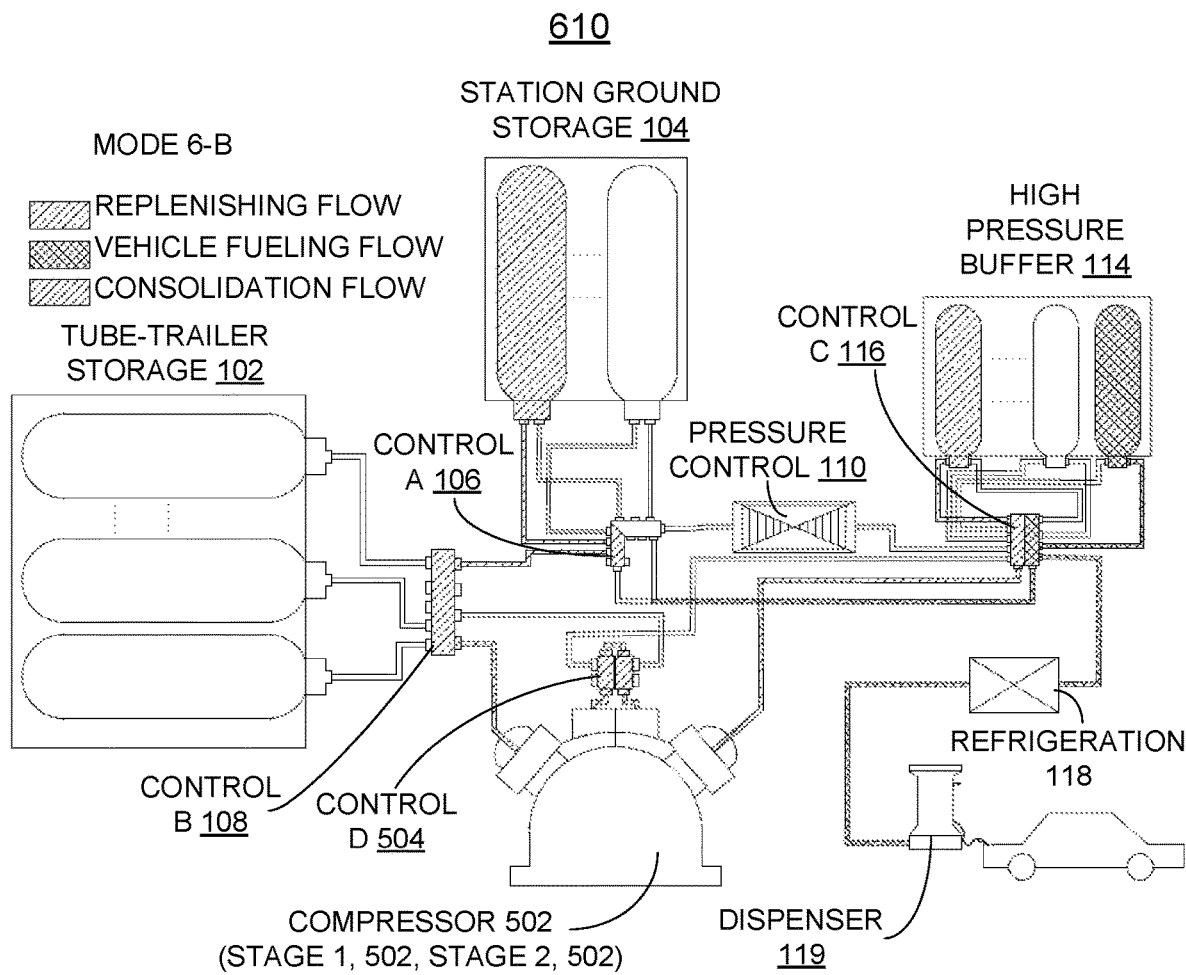

Referring to FIGS. 6A, and 6B, there are shown respective operational modes 6A, 6B generally designated by the reference character 600, 610. Operational modes 6A, 600, and 6B, 610 are similar to Modes 2A, 200, and 2B, 220 with compressor 112 that having two stages 1-2, 502, operating in series to replenish high-pressure buffer 114; Complete Task 1 (*a*) and Task 2 (*b*), followed by Task 1 (*b*) and Task 2 (*b*).

Figure 6C:
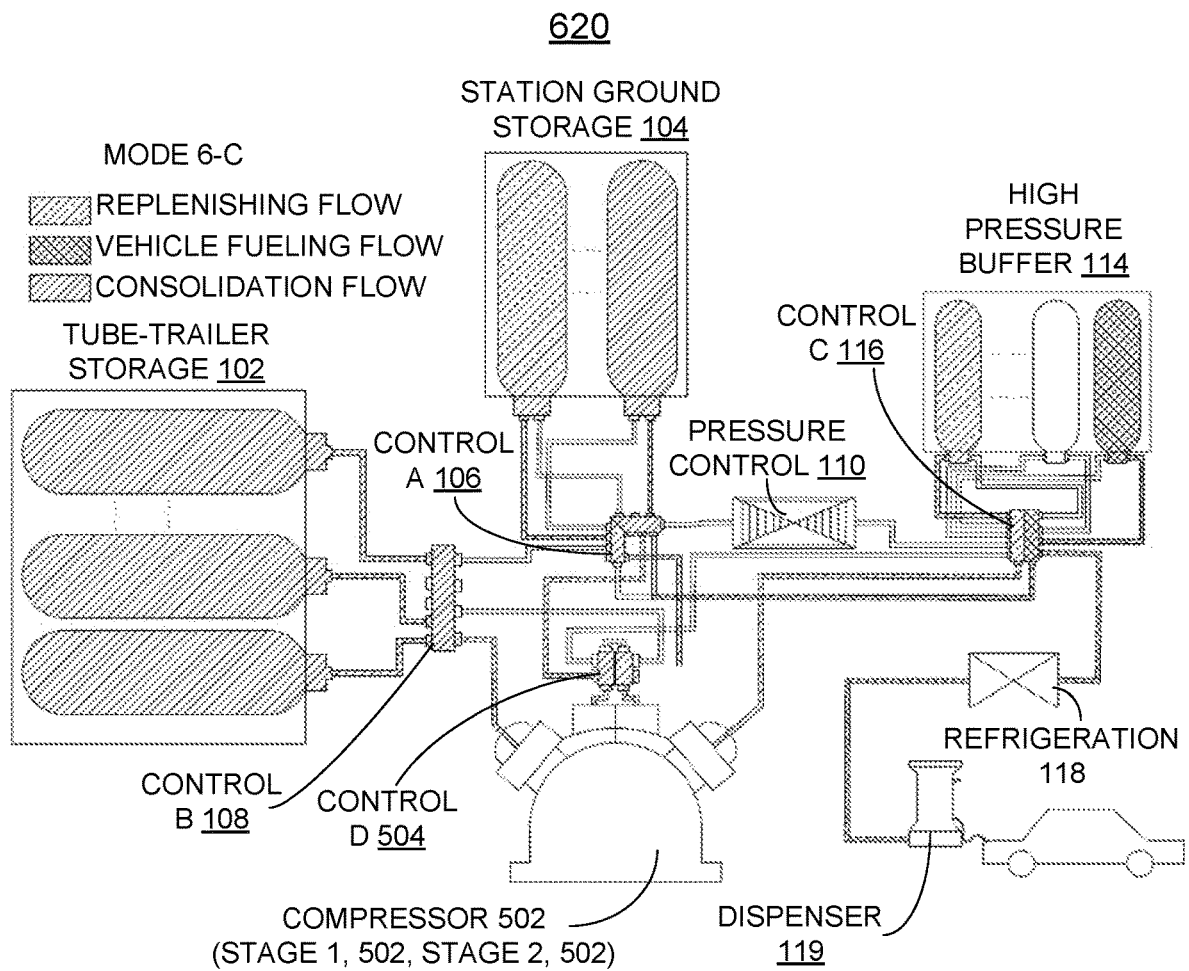

Referring to FIGS. 6A, and 6C, there are shown respective operational modes 6A, 6C generally designated by the reference character 600, 620. Operational mode 6A, 600, is similar to Mode 2A, 200. Operational Mode 6C, 620, uses compressor 502, while having two stages 1-2, 502, each capable of independently handling a separate stream operating, with stage 2, 502, replenishing high-pressure buffer 114 and stage 1, 502, consolidating from tube-trailers 102 to stationary ground storage 104; Complete Task 1 (*a*), Task 2 (*a*) and Task 3, or complete Task 1(*a*) and Task 2 (*b*), followed by Task 1 (*b*), Task 2 (*a*) and Task 3.

Figure 7A:
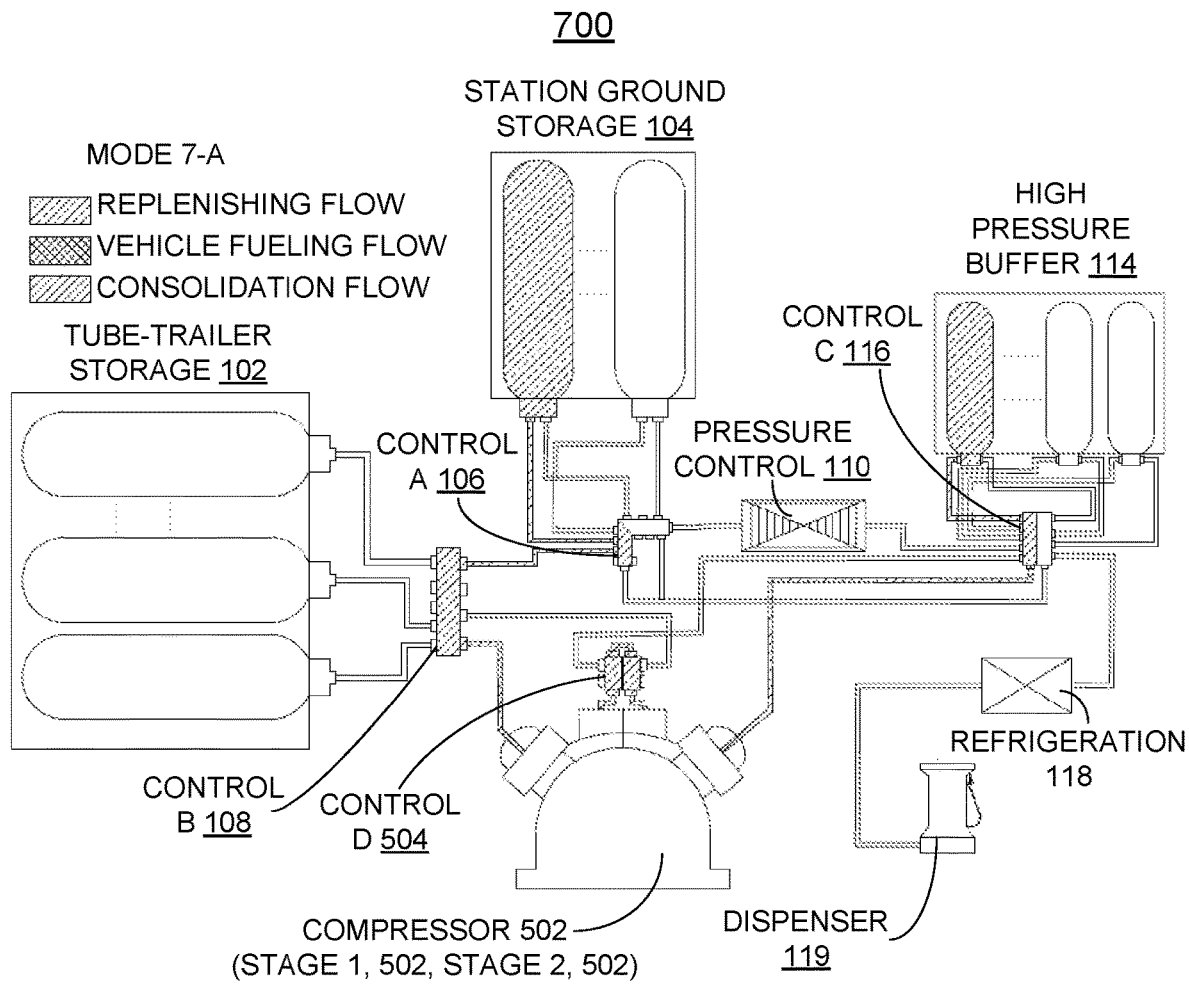
Figure 7B:
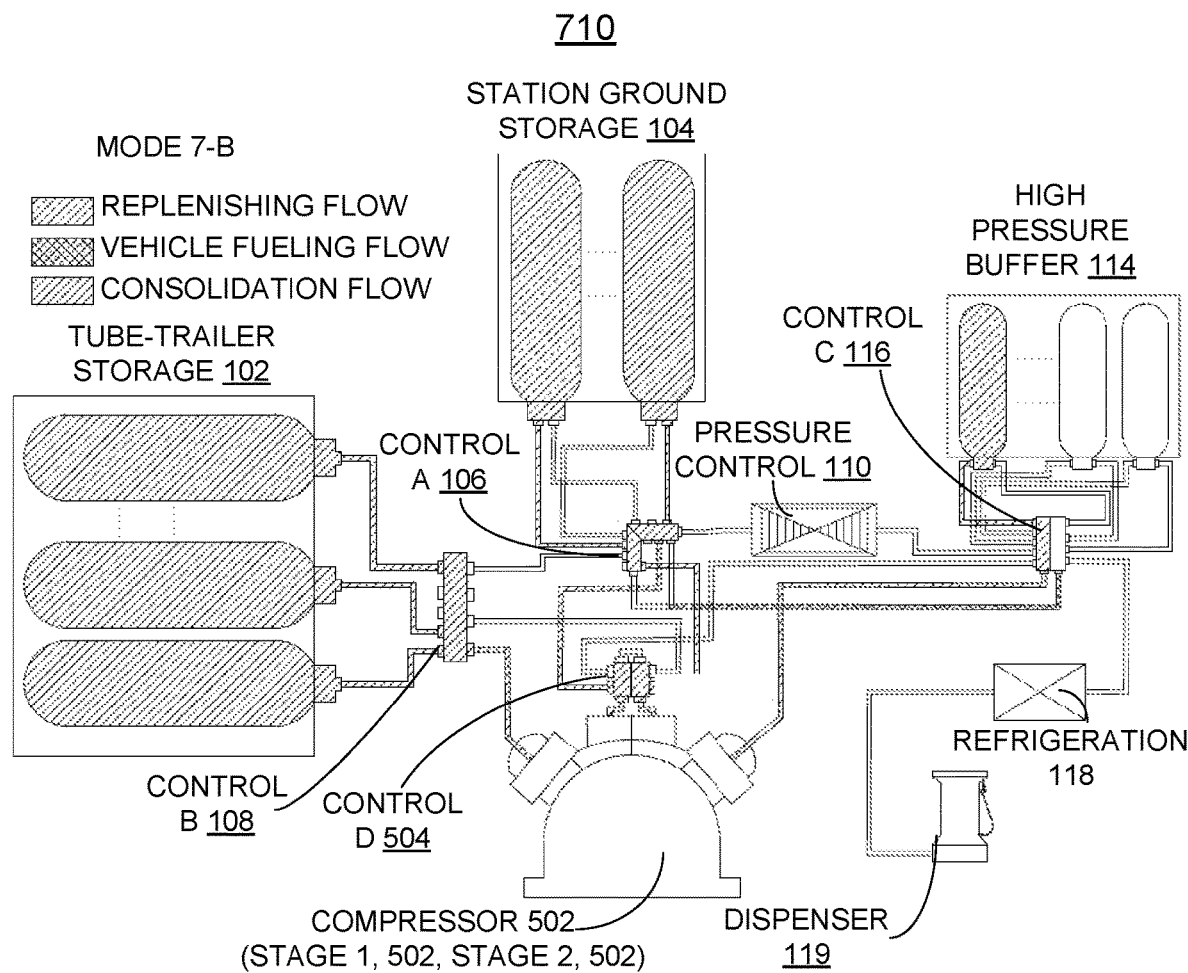

Referring to FIGS. 7A, and 7B, there are shown respective operational modes 7A, 7B generally designated by the reference character 700, 710. Operational mode 7A, 700, is similar to Mode 3, 300. Operational Mode 7B, 710, uses compressor 112, while having two stages 1-2 502, each capable of independently handling a separate stream, with stage 2, 502, replenishing high-pressure buffer 114 and stage 1, 502, consolidating from tube-trailers 102 to stationary ground storage 104; Complete Task 2 (*b*) for Mode 7A, or complete Task 2 (*a*) and Task 3 for Mode 7B.

Figure 8:
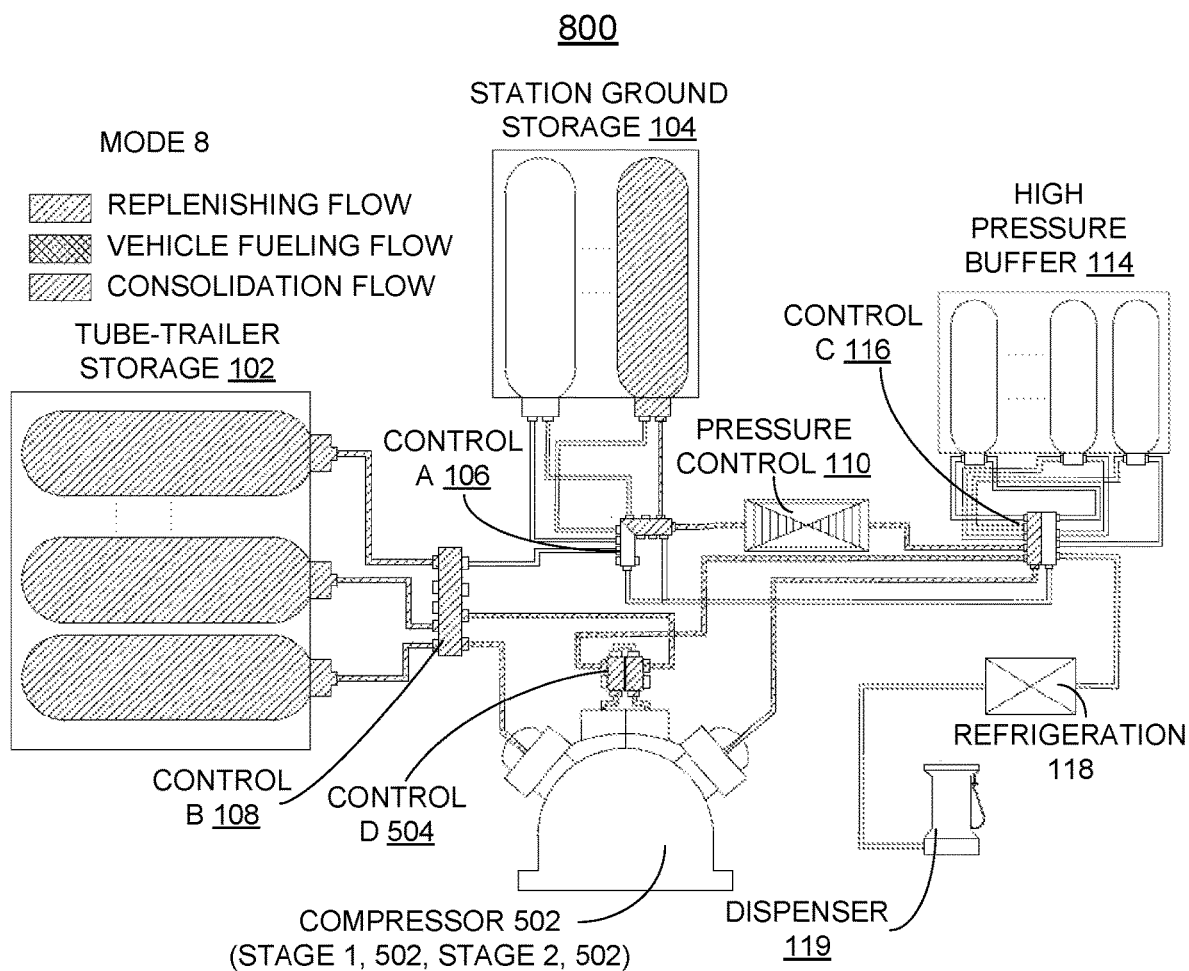

Referring to FIG. 8, there is shown an operational mode 8 generally designated by the reference character 800. Operational mode 8, 800 is similar to Mode 4, 400 with compressor 112 having two stages 1-2, 502, each capable of independently handling a separate stream; Complete Task 3.

Task 4 (Vehicle Fueling):

(a) Gaseous fuel is directly drawn from the pressure vessel bank with the highest pressure in stationary ground storage, 104 (i.e., bypassing compressor 112) to fill the vehicle's tank. This sub-task ends when the mass flow rate between the pressure vessel bank and the vehicle's tank reaches a predefined lower limit or until the pressure at the dispenser 119 cannot sustain the necessary flow required for vehicle fueling.

(b) Gaseous fuel is directly drawn by the compressor, 112, from the stationary ground storage pressure vessel bank, 104, with the highest pressure allowable by the compressor, to fill the vehicle's tank. This task ends when the vehicle reaches its maximum possible state of charge.

Task 5 (Tube-Trailer Consolidation):

An inactive pressure vessel bank with the highest pressure in stationary ground storage, 104, is filled (consolidated) from the pressure vessels in the tube-trailers, 102 through the compressor, 112. If the pressure in the destination pressure vessel bank of the stationary ground storage, 104 reaches the rated maximum pressure, the next highest pressure vessel bank in stationary ground storage, 104 is selected to be filled from the tube-trailers, 102 (consolidated). This continues until consolidation is complete (i.e., all pressure vessel banks in stationary ground storage, 104, are either at rated maximum pressure or all pressure vessels in the tube-trailers 102, are at their minimum operating pressure), or until there is a change of state.

Figure 9A:
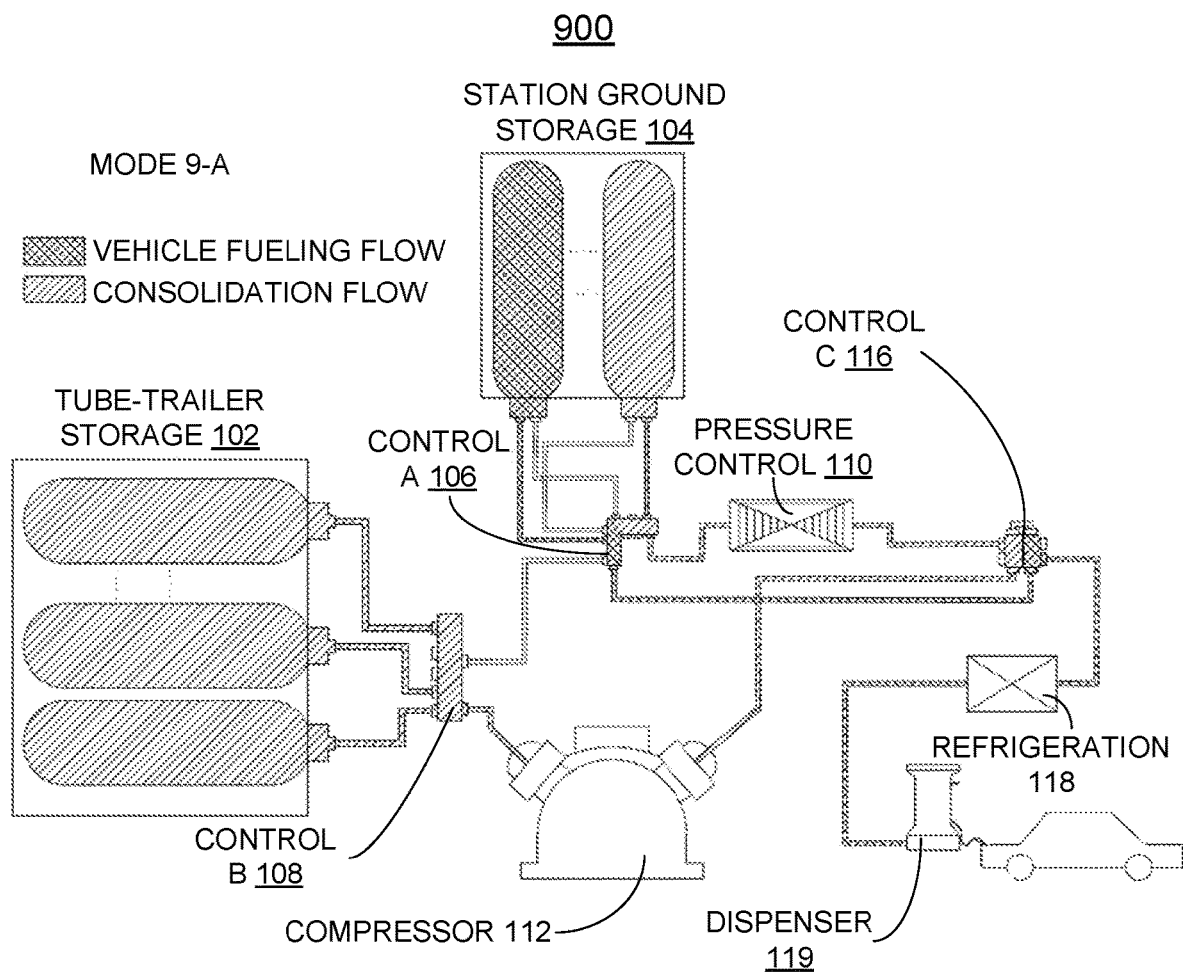
Figure 9B:
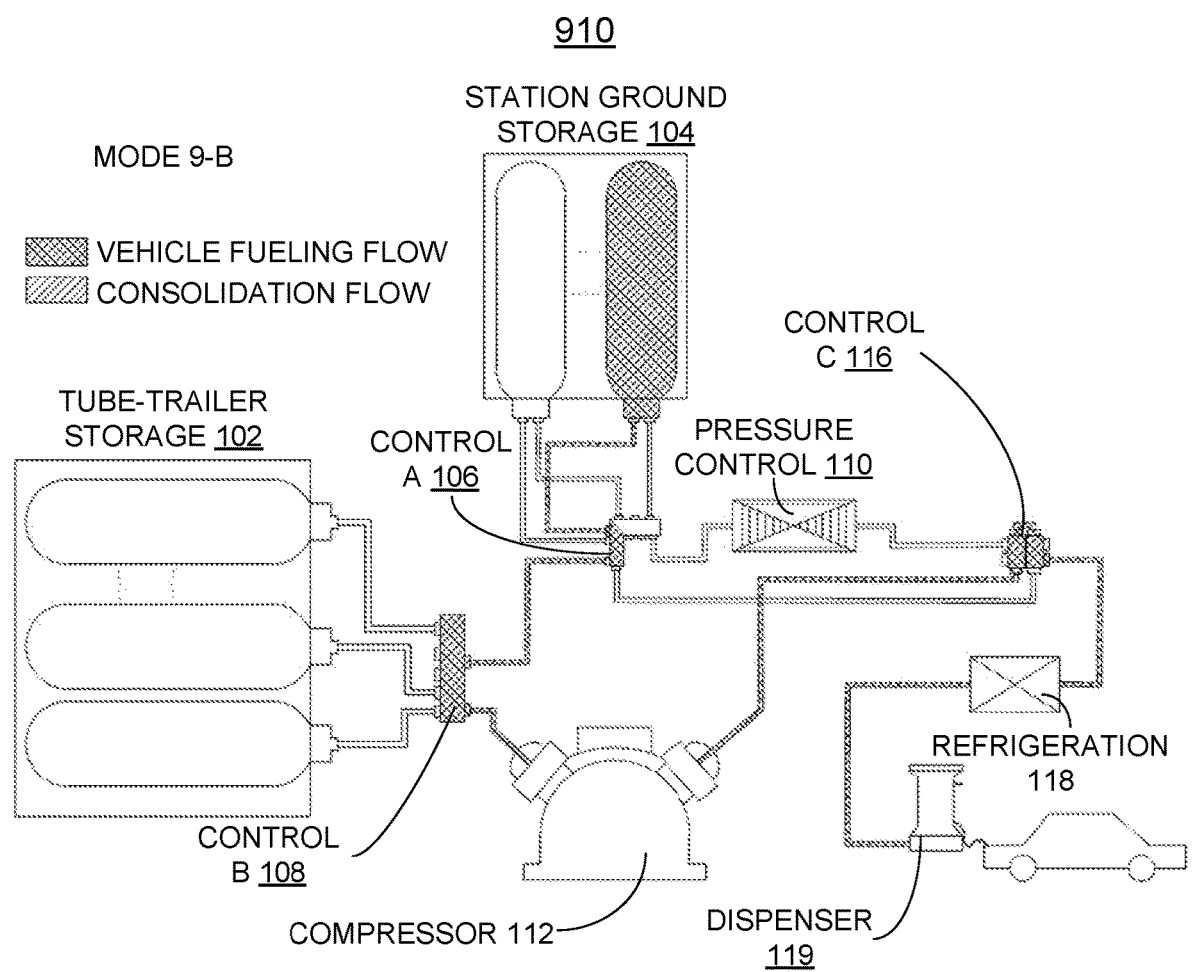
Figure 10:
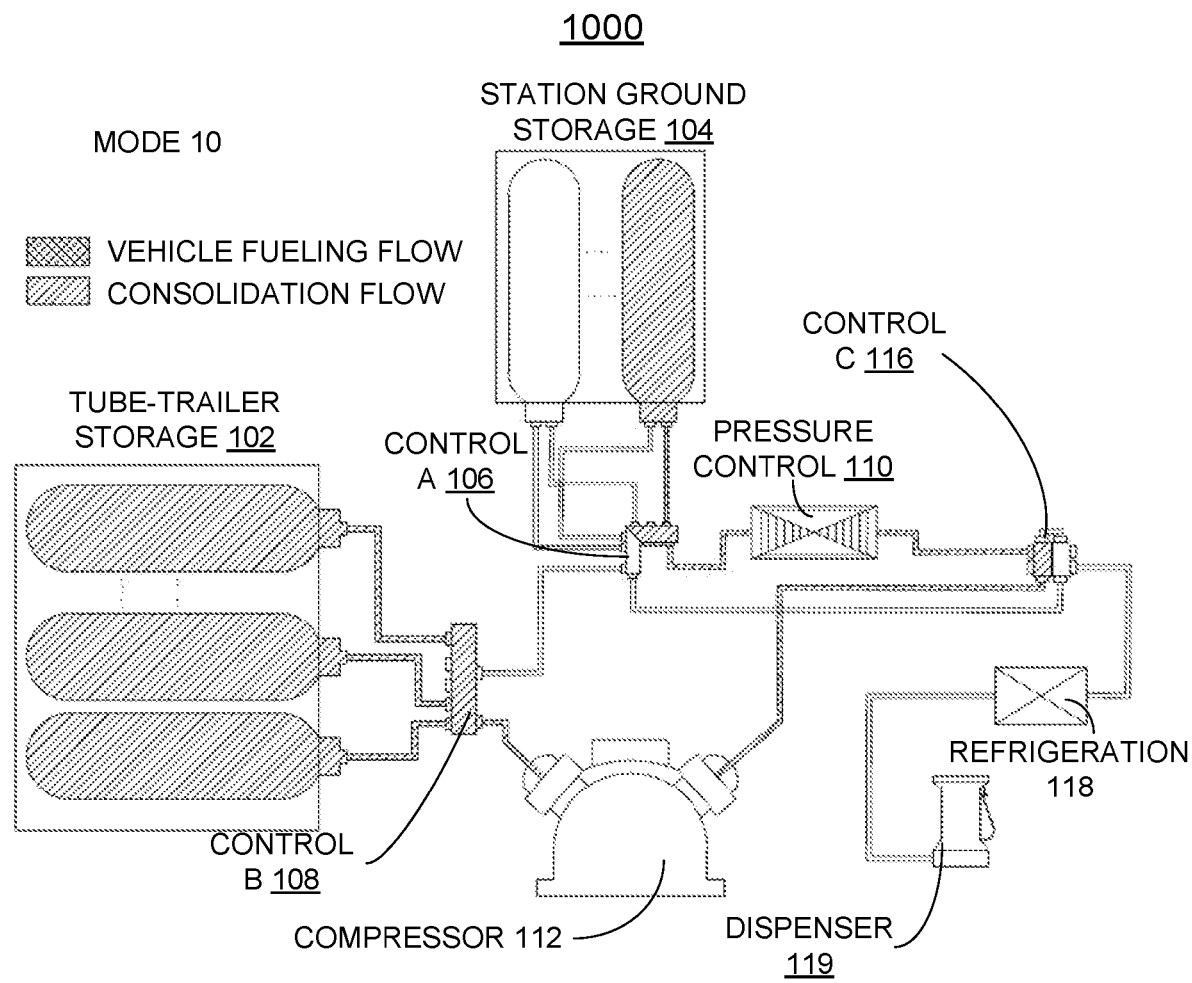

Referring to FIGS. 9A and 9B, and FIG. 10, there is shown an operational mode 9-A, 9-B, and 10 generally designated by the reference character 900, 912. Operational mode 9, 900 is similar to Modes 2A, 200, and 2B, 220 with compressor 502 handling one stream of gaseous fuel.

Referring to FIGS. 9A and 9B, there are shown respective operational modes 9A, and 9B generally designated by the reference characters 900, and 910. Operational mode 9A, includes completing Task 4 (*a*) and Task 5 simultaneously, followed by operational mode 9B which involves completing Task 4 (*b*).

Referring to FIG. 10, the operational mode 10, generally designated by the reference character 1000, includes completing Task 5.

Task 6 (Vehicle Fueling):

(a) Gaseous fuel is directly drawn from the pressure vessel bank with the highest pressure in stationary ground storage, 104, (i.e., bypassing compressor) to fill the vehicle's tank. This sub-task ends when the mass flow rate between the pressure vessel bank in stationary ground storage, 104, and the vehicle's tank reaches a predefined lower limit or until the pressure at the dispenser 119 cannot sustain the necessary flow required for vehicle fueling.

(b) Gaseous fuel is drawn from the stationary ground storage pressure vessel bank, 104, with the highest pressure allowable by the compressor, by the compressor's stage 1, 502, which directly feeds the compressor's stage 2, 502, in a combined (series) operation to fill the vehicle's tank. This subtask ends when the vehicle reaches its maximum possible state of charge.

(c) Gaseous fuel is directly drawn by the compressor's stage 2, 502, from the pressure vessel bank with the highest pressure in stationary ground storage, 104 to fill the vehicle's tank. This subtask ends when the vehicle reaches its maximum possible state of charge.

Task 7 (Tube-Trailer Consolidation):

The pressure vessel bank in stationary ground storage, 104, is filled (consolidated) from the pressure vessels in tube-trailers 102 through stage 1, 502 of the compressor 502, or through the separate and parallel operation of stage 1 and stage 2 of compressor 502 (in which both of the compressor stage 1 and stage 2, 502 draw separately from tube trailers 102), or through the series operation of combined stage 1 and stage 2 of compressor 502 (in which the compressor's stage 1, 502 draws from tube-trailers 102 and feeds into the compressor's stage 2, 502). If the pressure in the destination pressure vessel bank of the stationary ground storage 104 reaches the rated maximum pressure, the next highest pressure vessel bank in the stationary ground storage 104 is selected to be filled from the tube-trailers, 102 (consolidated). This continues until consolidation is complete (i.e., all pressure vessel banks in the stationary ground storage 104, are either at their rated maximum pressure or all pressure vessels in the tube-trailers 102, are at their specified minimum operating pressure), or until there is a change of state Referring to FIGS. 11A and 11B, there are shown respective operational modes 11A, and 11B, generally designated by the reference characters 1100 and 1110, respectively. Operational mode 11A, includes simultaneously completing Task 6 (*a*) and Task 7, followed by mode 11B, completing Task 6 (*b*).

Figure 11A:
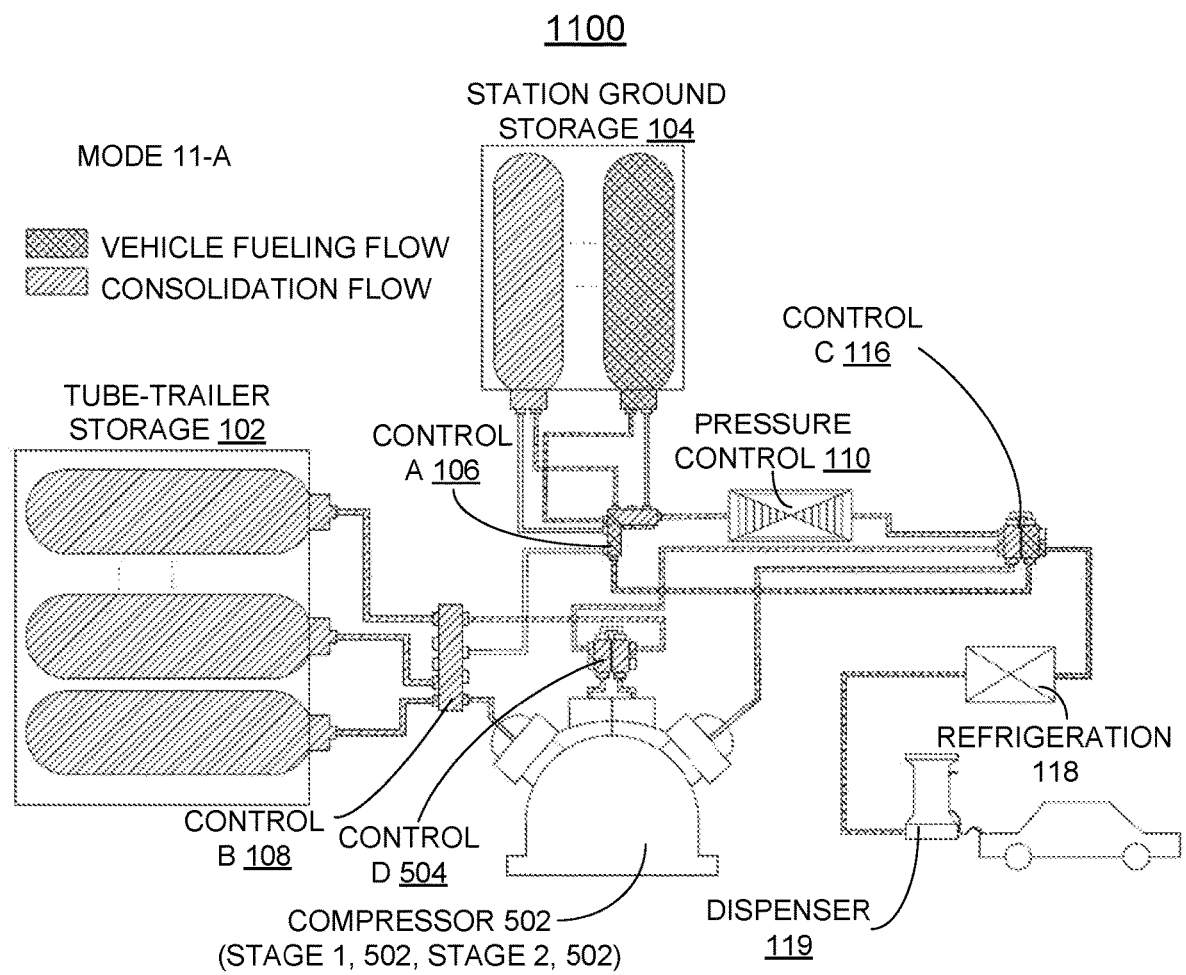
Figure 11B:
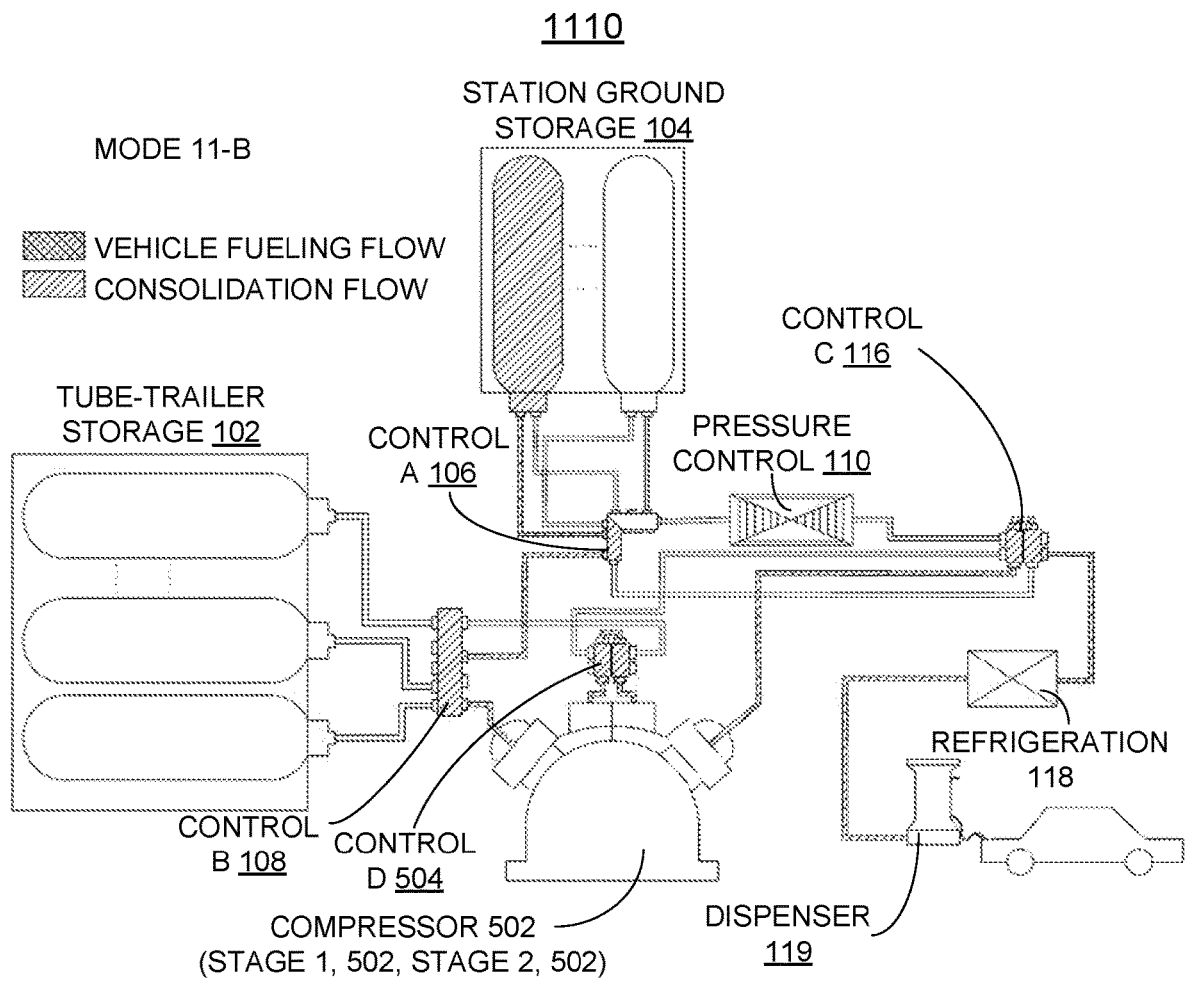
Figure 11C:
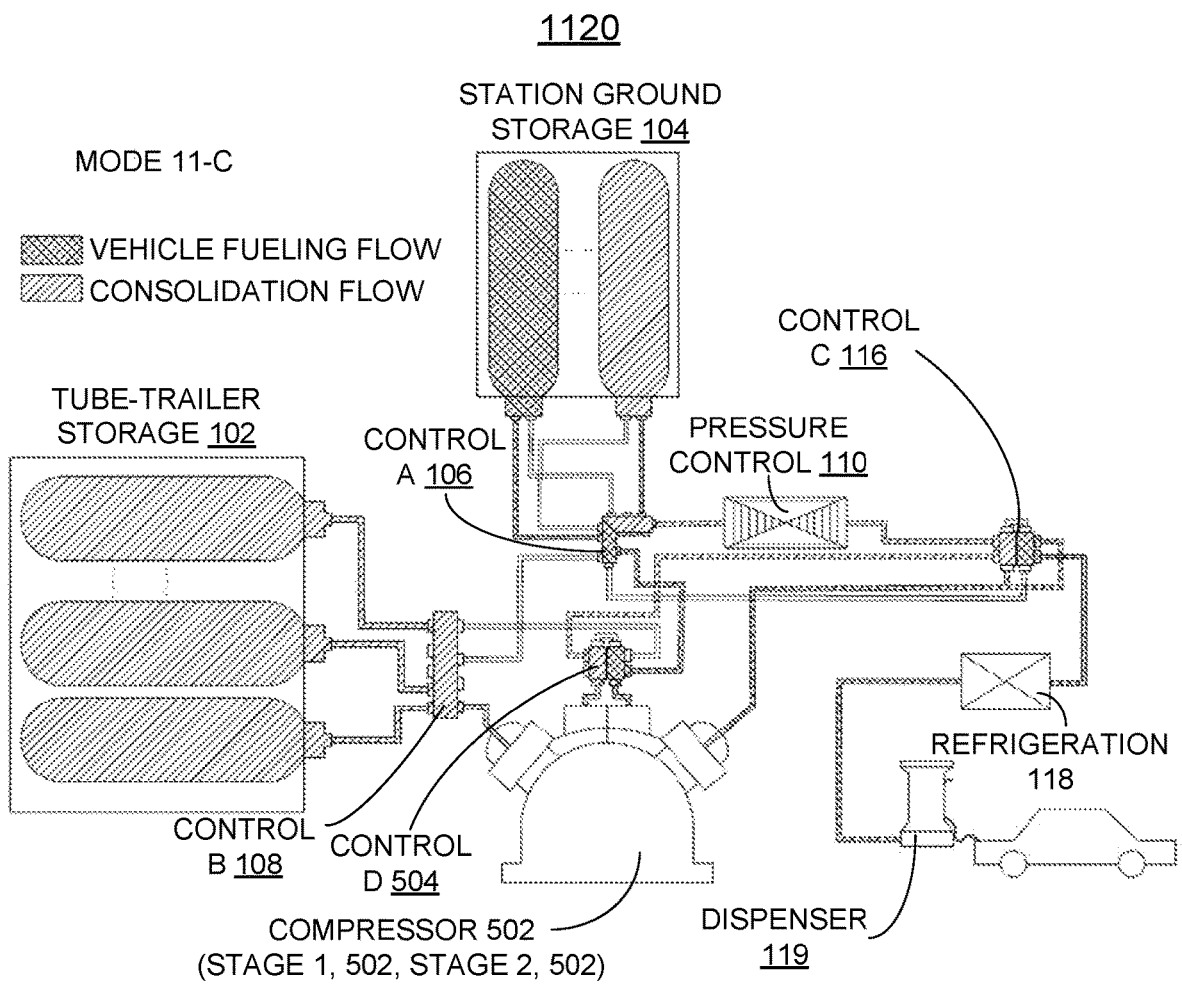

Referring to FIGS. 11A, and 11C, there are shown respective operational modes 11A, 11C generally designated by the reference character 1100, 1120. Operational Mode 11C, 1120, uses compressor 502, while having two stages 1-2, 502, each capable of independently and simulataneously handling a separate stream operating, with stage 2, 502, filling the vehicle's tank by drawing from the stationary ground storage, 104, and stage 1, 502, consolidating from the tube-trailers 102 to the stationary ground storage 104; Complete Task 6 (*a*) and Task 7, followed by completing Task 6 (*c*) and Task 7.

Figure 12:
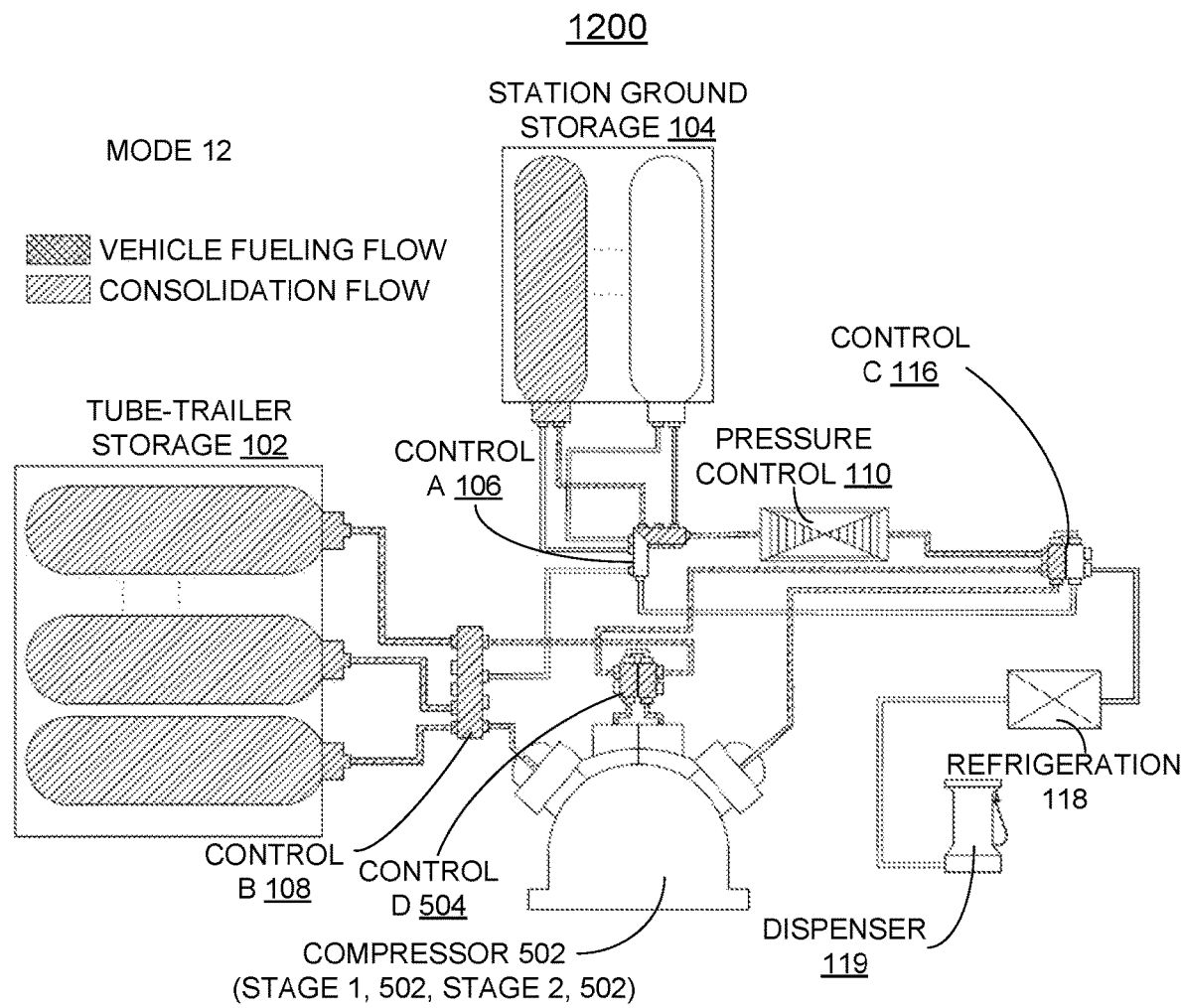

In FIG. 12, the operational mode 12, generally designated by character 1200, includes completing Task 7.

In brief summary, the use of the stationary ground storage 104 at the higher pressure for refueling significantly improves tube-trailer payload utilization and fueling speed as compared to only using tube-trailers 102 of conventional arrangements. For example, the present invention allows the gaseous fuel pressure of the stationary ground storage 104 to be much higher than the gaseous fuel pressure in the tube trailers 102, which is limited by U.S. Department of Transportation (DOT) regulations (since DOT certification limits the maximum vessel pressure for tube-trailer delivery), thus allowing much higher compressor (112 or 502) throughput and significantly increasing the refueling capacity of the station. The integrated tube-trailers and stationary ground storage system enables effective and efficient use of a single compressor, 112 (single stage) or 502 (multiple stages), together with reducing the refueling costs.

While the present invention has been described with reference to the details of the embodiments of the invention shown in the drawing, these details are not intended to limit the scope of the invention as claimed in the appended claims.

What is claimed is:

1. An integrated tube-trailers and stationary ground storage system for implementing enhanced pressure consolidation operations for refueling gaseous fuels comprising:
    a gaseous fuel refueling station includes gaseous fuel supply pressure vessels of tube-trailers, stationary ground storage including at least two stationary pressure vessels, and a high-pressure buffer storage;
    a compressor for consolidating gaseous fuel from said gaseous fuel supply pressure vessels of tube-trailers to said stationary ground storage;
    said high-pressure buffer storage is configured to be filled from said stationary ground storage through said compressor;
    a first control unit coupled to the stationary ground storage and a second control unit coupled to said pressure vessels of the tube-trailers with said first and second control units coupled together and coupled to said compressor;
    said first control unit configured for enabling enhanced compressor throughput during refueling operation, said stationary ground storage used to refuel vehicles, said first control unit configured for using said stationary ground storage for refueling with gaseous fuel drawn from one stationary pressure vessel having highest pressure;
    said first control unit configured for enabling said compressor consolidating fuel from said supply tube trailer pressure vessels to said stationary ground storage until said at least two stationary pressure vessels of said stationary ground storage reach a rated maximum pressure, substantially higher pressure than said gaseous fuel supply pressure vessels of tube-trailers, enabling enhanced compressor throughput during refueling operation; and
    said second control unit configured for enabling enhanced payload utilization of the tube-trailers with said second control unit configured for supplying said compressor with gaseous fuel from said gaseous fuel supply pressure vessels of tube trailers until said supply pressure vessels of tube trailers reach a minimum specified operating pressure for said compressor consolidating said supplied gaseous fuel to said stationary ground storage.

2. The system as recited in claim 1 wherein said stationary ground storage for refueling, said first control unit configured for enabling said at least two stationary pressure vessels of said stationary ground storage to reach said rated maximum pressure enabling substantially higher pressure than said gaseous fuel supply pressure vessels of tube-trailers, wherein said first control unit configured for using said stationary ground storage for refueling with gaseous fuel drawn from one stationary pressure vessel having highest pressure; and said compressor, said first control unit and said second control unit together configured for enabling significantly improved station utilization.

3. The system as recited in claim 1 wherein said stationary ground storage for refueling, wherein said compressor, said first control unit and said second control unit together configured for enabling said at least two stationary pressure vessels of said stationary ground storage to reach said rated maximum pressure, enabling substantially higher pressure than said gaseous fuel supply pressure vessels of tube-trailers, said compressor, said first control unit and said second control unit together configured for enabling effectively and efficiently using one said compressor together with reducing the refueling costs.

4. The system as recited in claim 1 includes said compressor, said first control unit and said second control unit together configured for consolidating gaseous fuel from said gaseous fuel supply pressure vessels of tube-trailers into said stationary ground storage until said stationary ground storage reaches a rated maximum pressure or until said supply pressure vessels of tube trailers reach a minimum specified operating pressure for said compressor consolidating said supplied gaseous fuel to said stationary ground storage.

5. The system as recited in claim 1 includes said first control unit configured for using said stationary ground storage at high pressure directly for refueling.

6. The system as recited in claim 5 includes said first control unit configured for using gaseous fuel directly drawn from said one stationary pressure vessel having highest pressure of said stationary ground storage to fill a vehicle's tank.

7. The system as recited in claim 1 wherein said compressor includes a single stage compressor.

8. The system as recited in claim 1 wherein said compressor includes a first stage and a second stage and said first stage and said second stage are independently and simultaneously capable of handling a separate gaseous fuel stream.

9. The system as recited in claim 1 includes a dispenser coupling a gaseous fuel flow from said stationary ground storage for refueling a vehicle.

10. The system as recited in claim 1 wherein said high-pressure buffer storage is coupled to a dispenser coupling a gaseous fuel flow for refueling a vehicle.

11. The system as recited in claim 1 wherein said compressor, said first control unit and said second control unit together configured for enabling operation of said stationary ground storage at substantially higher pressure than said gaseous fuel supply pressure vessels of tube-trailers, and configured for consolidating fuel from said supply pressure vessels of tube trailers until said supply pressure vessels of tube trailers reach said minimum specified operating pressure for said compressor consolidating said supplied gaseous fuel to said stationary ground storage enabling enhanced payload utilization of the tube-trailers.

12. The system as recited in claim 1 includes a dispenser connected to a vehicle for refueling, and wherein said compressor, and said first control unit and said second control unit together configured to implement predefined operational modes responsive to said dispenser being connected to said vehicle.

13. A method for implementing enhanced pressure consolidation operations for refueling gaseous fuels in an integrated tube-trailers and stationary ground storage system, said method comprising:
    providing a gaseous fuel refueling station including gaseous fuel supply pressure vessels of tube-trailers and providing stationary ground storage for refueling including at least two stationary pressure vessels for refueling;
    providing a compressor for consolidating gaseous fuel from said gaseous fuel supply pressure vessels of tube-trailers to said at least two stationary pressure vessels of said stationary ground storage;
    coupling a first control unit to said at least two stationary pressure vessels of said stationary ground storage, coupling a second control unit coupled to said pressure vessels of said tube-trailers, and coupling said first control unit and said second control unit together and to said compressor;
    providing said first control unit configured for compressor for refueling gaseous fuel directly from said stationary ground storage to a vehicle;
    providing said stationary ground storage for refueling with gaseous fuel drawn from one stationary pressure vessel having highest pressure;
    providing said first control unit for enabling said compressor consolidating fuel from said tube trailers to said stationary ground storage until said stationary pressure vessels of said stationary ground storage reach a rated maximum pressure, said stationary ground storage for refueling with substantially higher pressure than said gaseous fuel supply pressure vessels of tube-trailers, enabling enhanced compressor throughput during refueling operation;
    providing said second control unit configured for enabling higher utilization of tube-trailers payload with said second control unit configured for supplying said compressor with gaseous fuel from said gaseous fuel supply pressure vessels of tube trailers until said supply pressure vessels of tube trailers reach a minimum specified operating pressure for said compressor consolidating said supplied gaseous fuel to said stationary ground storage;
    providing a high-pressure buffer storage for directly fueling the vehicle;
    replenishing said high-pressure buffer storage from said stationary ground storage; and
    refueling the vehicle selectively from said stationary ground storage and said high-pressure buffer storage.

14. The method as recited in claim 13 includes providing said compressor, said first control unit and said second control unit together configured for providing higher gaseous fuel pressure of said stationary ground storage to said compressor for refueling to maximize throughput of said compressor during station refueling operation and enhance refueling capacity.

15. The method as recited in claim 13 includes providing said compressor, said first control unit and said second control unit together configured for providing gaseous fuel pressure of said stationary ground storage for refueling enabling enhanced tube-trailer payload utilization and enabling enhanced compressor throughput during refueling operation.

16. The method as recited in claim 13 includes providing said compressor, said first control unit and said second control unit together configured for providing gaseous fuel pressure of said stationary ground storage for refueling, enabling effectively and efficiently using one said compressor and reducing the refueling costs.

17. The method as recited in claim 13 wherein providing said compressor includes providing a single stage compressor.

18. The method as recited in claim 13 wherein providing said compressor includes providing said compressor with a first stage and a second stage, and both said first stage and said second stage selectively combined and independently capable of handling a separate gaseous fuel stream.

* * * * *